(12) United States Patent
Okada et al.

(10) Patent No.: US 8,200,070 B2
(45) Date of Patent: Jun. 12, 2012

(54) RECORDING MEDIUM, PLAYBACK APPARATUS, RECORDING METHOD, PROGRAM, AND PLAYBACK METHOD

(75) Inventors: Tomoyuki Okada, Nara (JP); Wataru Ikeda, Osaka (JP); Yasushi Uesaka, Sanda (JP); Masayuki Kozuka, Neyagawa (JP)

(73) Assignee: Panasonic Corporation, Osaka (JP)

( * ) Notice: Subject to any disclaimer, the term of this patent is extended or adjusted under 35 U.S.C. 154(b) by 1379 days.

(21) Appl. No.: 11/756,552

(22) Filed: May 31, 2007

(65) Prior Publication Data

US 2007/0230917 A1 Oct. 4, 2007

Related U.S. Application Data

(62) Division of application No. 10/545,996, filed on Dec. 13, 2006, now Pat. No. 8,068,723.

(51) Int. Cl.
*H04N 9/80* (2006.01)
*H04N 5/89* (2006.01)

(52) U.S. Cl. ......................... 386/336; 386/248
(58) Field of Classification Search .................. 386/248, 386/332–337
See application file for complete search history.

(56) References Cited

U.S. PATENT DOCUMENTS

| 5,245,328 A * | 9/1993 | Garrett ........................... 345/696 |
| 6,088,507 A | 7/2000 | Yamauchi et al. |
| 6,181,870 B1 | 1/2001 | Okada et al. |
| 6,484,233 B1 | 11/2002 | Fujinami et al. |
| 6,798,981 B1 | 9/2004 | Yamauchi et al. |
| 6,982,727 B2 * | 1/2006 | Baer et al. ....................... 345/629 |
| 7,139,470 B2 | 11/2006 | Lopez-Estrada et al. |
| 7,162,645 B2 | 1/2007 | Iguchi et al. |
| 7,236,687 B2 | 6/2007 | Kato et al. |
| 7,283,723 B2 | 10/2007 | Wilson et al. |
| 7,403,695 B2 | 7/2008 | Kikuchi et al. |
| 2004/0138873 A1 * | 7/2004 | Heo et al. ....................... 704/201 |
| 2004/0252983 A1 * | 12/2004 | Jung et al. ...................... 386/125 |
| 2005/0008337 A1 | 1/2005 | Yamauchi et al. |
| 2005/0008338 A1 | 1/2005 | Yamauchi et al. |

FOREIGN PATENT DOCUMENTS

EP 0 903 744 3/1999

(Continued)

OTHER PUBLICATIONS

Blu-Ray Disc Founders, "White Paper Blu-ray Disc Format—2.B Audio Visual Application Format Specifications for BD-Rom", Aug. 2004, pp. 1-35.

(Continued)

*Primary Examiner* — Thai Tran
*Assistant Examiner* — Nigar Chowdhury
(74) *Attorney, Agent, or Firm* — Panasonic Patent Center; Dhiren Odedra; Kerry Culpepper

(57) ABSTRACT

On a BD-ROM, an AVClip and a plurality of playback section information (PlayItems) are recorded. The AVClip includes a video stream multiplexed with a plurality of elementary streams. The playback section information Playable_PID_entries showing the playback start point and the playback end point in the video stream correlated with the filtering specification of each elementary stream. The filtering specification specifies whether each of the plurality of elementary streams are able to be played back or not.

4 Claims, 27 Drawing Sheets

VIDEO PLAYBACK IN MOVIE MODE

VIDEO PLAYBACK IN ENHANCED MODE

BUTTONS MULTIPLEXED ON STREAM
SUBTITLE MULTIPLEXED ON STREAM
WINDOW RENDERED BY JAVA PROGRAM
GRAPHICS RENDERED BY JAVA PROGRAM

FOREIGN PATENT DOCUMENTS

| | | |
|---|---|---|
| EP | 1 103 974 | 5/2001 |
| EP | 1 198 133 | 4/2002 |
| EP | 1249835 A2 | 10/2002 |
| EP | 1 408 686 | 4/2004 |
| JP | 05-244150 | 9/1993 |
| JP | 2000-152182 | 5/2000 |
| JP | 2001-325128 | 11/2001 |
| JP | 2002-45753 | 8/2002 |
| JP | 2002-229861 | 8/2002 |
| JP | 2002-245753 | 8/2002 |
| JP | 2002-351567 | 12/2002 |
| JP | 2003-6979 | 1/2003 |
| WO | 99/14935 | 3/1999 |
| WO | 02/091747 A1 | 11/2002 |

OTHER PUBLICATIONS

EP Office Action for corresponding application No. 07112336.8., dated May 21, 2010.

Echiffre, M. et al. "MHEG-5-aims, concepts, and implementation issues" *Multimedia, IEEE*, [Online] vol. 5, (Mar. 31, 1998), pp. 84-91.

Habraken, Joe, "Ten Minute Guide to Microsoft PowerPoint 2002", Nov. 13, 2001, 6 pages.

"Java GUI Development: The Authoritative Solution", Aug. 25, 1999, 8 pages.

Intel Corporation and Microsoft Corporation, "PC 99 System Design Guide: A Technical Reference for Designing PCs and Peripherals for the Microsoft® Windows® Family of Operating Systems", Jan. 1, 1999, pp. 89-96 and 231-395.

* cited by examiner

FIG. 1
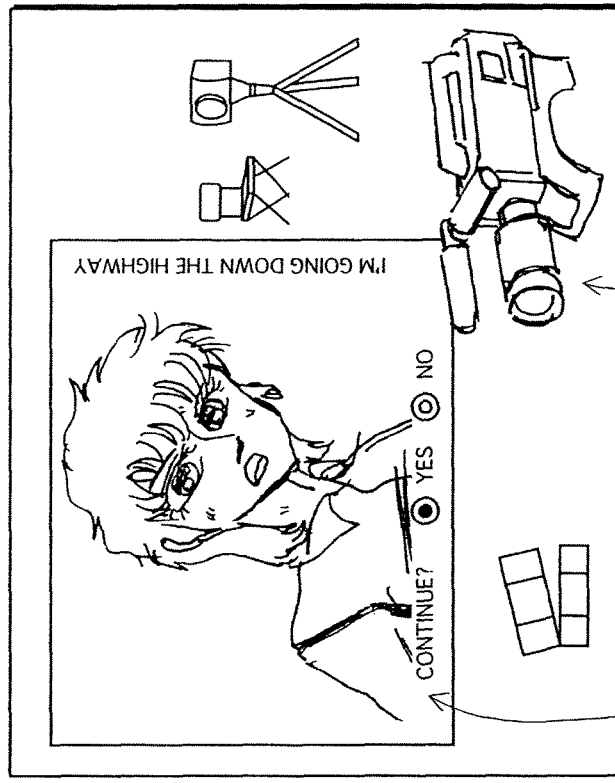
VIDEO PLAYBACK IN ENHANCED MODE
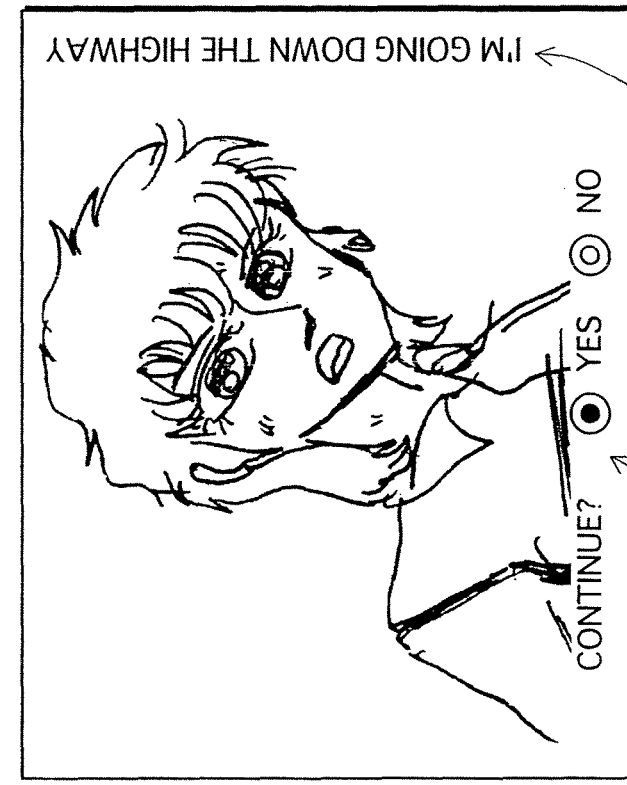
VIDEO PLAYBACK IN MOVIE MODE

FIG.19 FILTERING SPECIFICATION IN MOVIE MODE

FILTERING SPECIFICATION IN ENHANCED MODE

ALLOCATION OF ENHANCED INTERACTIVE
GRAPHICS PLANE IN MOVIE MODE

□ ・・・ 8-BIT AREA

ALLOCATION OF INTERACTIVE GRAPHICS
PLANE IN ENHANCED MODE

□ ・・・ 32-BIT AREA

RECORDING MEDIUM, PLAYBACK APPARATUS, RECORDING METHOD, PROGRAM, AND PLAYBACK METHOD

This application is a divisional of U.S. patent application Ser. No. 10/545,996 filed on Dec. 13, 2006 now U.S. Pat. No. 8,068,723.

TECHNICAL FIELD

The present invention relates to recording media such as BD-ROMs, and playback apparatuses, and to a technique for executing playback of video data recorded on a recording medium, in two different modes: movie mode and enhanced mode.

BACKGROUND ART

With an object of setting BD-ROMs apart from DVDs while maintaining compatibility with DVDs, a technique that has been introduced into BD-ROM playback apparatuses is playback of video in two different modes, specifically, movie mode and enhanced mode. Movie mode is a playback mode that has the playback apparatus execute a program for performing DVD-like control to provide playback control that is DVD-compatible. One the other hand, enhanced mode is a playback mode that executes Java programs or the like while playing the same digital stream as movie mode. FIG. 1 illustrates screen display in movie mode and enhanced mode. Video playback in conjunction with the execution of a Java program enables playback in which graphics rendered by the Java program are composited with the video. Since such compositing is not possible with DVDs, this enhanced mode could prove to be highly instrumental in setting BD-ROMs apart from DVDs.

Graphics data of subtitles, buttons, or the like is multiplexed with the video stream of the video, and these together constitute one transport stream. This is to tightly synchronize display of the subtitles, buttons or the like with the video. With the transport stream being constituted in such a manner, the graphics data of subtitles, buttons, or the like is read by the playback apparatus regardless of whether the playback mode is enhanced mode or movie mode. The graphics data is read from the digital stream and placed in a margin area, resulting in the graphics data appearing on the screen in a manner such as the subtitle "I'm continuing down the highway", and buttons "YES" and "NO" in FIG. 1. However, when a Java program attempts to render a character string or a graphic in the margin area, the character string or graphic is obstructed by the subtitles and the buttons. In addition, the subtitles and the buttons pose a further nuisance if the size of the video is reduced for use in the Java program. This is because if the subtitles and buttons are reduced at the same rate as the video, they become too small to read and therefore simply appear as dirt on the screen. Faced with the problem of the rendition area of the Java program being obstructed, the Java programmer will be seized with the temptation to either delete or hide the subtitles and buttons. However, when the movie work is composed of a plurality of digital streams, the number of subtitles and buttons multiplexed differs between digital streams. In addition, the display position of the subtitles and the buttons also changes with each digital stream. In other words, a disparity exists in that buttons and subtitles may be included in some digital streams but not in others. When such a disparity exists, it is considerably difficult to write a Java program in a manner that the subtitles and buttons are deleted or hidden, and therefore this disparity poses an obstacle to Java programming.

DISCLOSURE OF THE INVENTION

An object of the present invention is to provide a recording medium that, while realizing playback in two modes: movie mode and enhanced mode, also realizes smooth screen rendering according to an enhanced mode program.

In order to achieve the stated object, the present invention is a recording medium on which is recorded a digital stream and a plurality of pieces of playback section information, wherein the digital stream is composed of a plurality of elementary streams that have been multiplexed together, at least one of the elementary streams being a video stream, each piece of playback section information indicates a playback start point and a playback end point in the video stream in correspondence with a filtering specification for the elementary streams, and the filtering specification is a specification of which one or more of the elementary streams is permitted to be played.

In enhanced mode, when a Java program attempts to use elementary streams that are multiplexed on an interactive graphics stream, playback control is performed via playback section information in which a filtering specification is made so that elementary streams that express subtitles, buttons, and the like are not played. This enables the Java program to realize rendition processing without interference from the subtitles, buttons, or the like.

Even when one movie work is composed of a plurality of streams of which some have subtitles and buttons multiplexed thereon and others do not, playing of the subtitles and buttons which pose an interference to rendering by the Java program can be prevented without having to consider the disparity in the number of multiplexed digital streams throughout the movie work. This is achieved via the playback section information provided with respect to the digital streams. As a result, the effort required by a programmer who writes the Java program is alleviated, and programs that use the video can be created relatively easily. Therefore, the present invention is able to induce entry of many software houses into the creation of disks for distribution of movie works.

BRIEF DESCRIPTION OF THE DRAWINGS

FIG. 1 schematically shows how graphics multiplexed on a digital stream are read and displayed by a playback apparatus;

BEST MODE FOR CARRYING OUT THE INVENTION

First Embodiment

Figure 2:
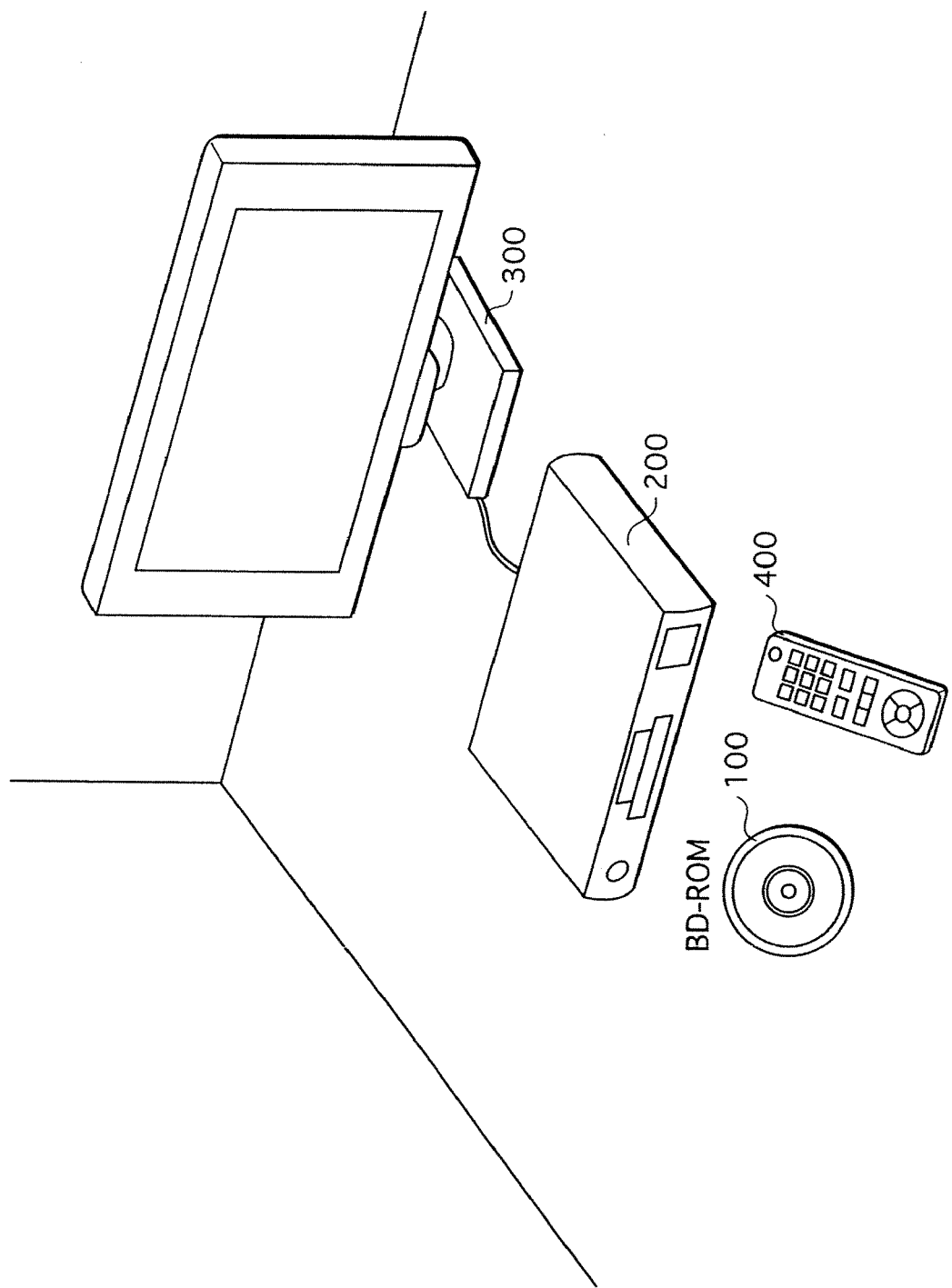
FIG. 2 shows a usage act of a recording medium pertaining to the present invention.

An embodiment of a recording medium pertaining to the present invention is described below. Firstly, a usage act is described in relation to the present invention. FIG. 2 shows a usage act of a recording medium pertaining to the present invention. A BD-ROM 100 in FIG. 2 is a recording medium pertaining to the present invention. The BD-ROM 100 is used to supply movie works in a home theater system formed from a playback apparatus 200, a television 300, and a remote controller 400.

Figure 3:
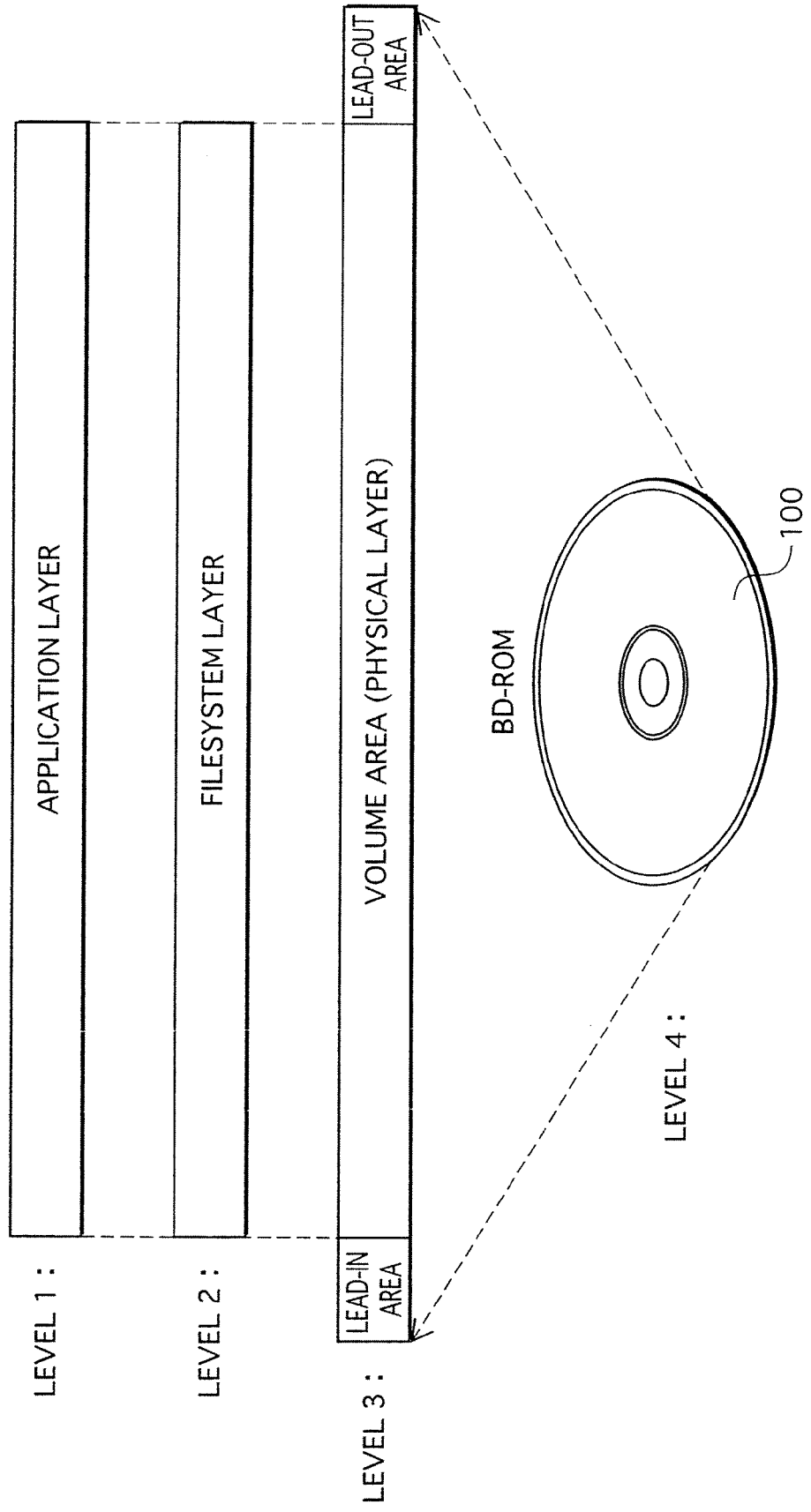
FIG. 3 shows a structure of a BD-ROM.

Next, a production act is described in relation to the implementation of a recording medium pertaining to the present invention. A recording medium pertaining to the present invention can be implemented as a result of enhancements in the application layer of BD-ROMS. FIG. 3 shows the structure of a BD-ROM.

Level 4 in FIG. 3 shows a BD-ROM, and level 3 shows a track on the BD-ROM. The track at level 3 depicts, in a laterally drawn-out form, the tracks spiraling from the inside to the outside of the BD-ROM. These tracks are formed from a lead-in area, a volume area, and a lead-out area. The volume area in FIG. 3 has a layer model consisting of a physical layer, a file system layer, and an application layer. A recording medium pertaining to the present invention is industrially manufactured by forming the data format shown in FIG. 3 on the application layer of a BD-ROM. Note that when a plurality of each of files XXX.M2TS, XXX.CLPI, and YYY.MPLS exist, it is preferable that three directories, specifically a STREAM directory, a CLIPINF directory, and a STREAM directory, are provided below the BDMV directory. The STREAM directory stores files of the same type as XXX.M2TS, the CLIPINF stores files of the same type as XXX.CLPI, and the PLAYLIST directory stores files of the same type as YYY.MPLS.

Figure 4:
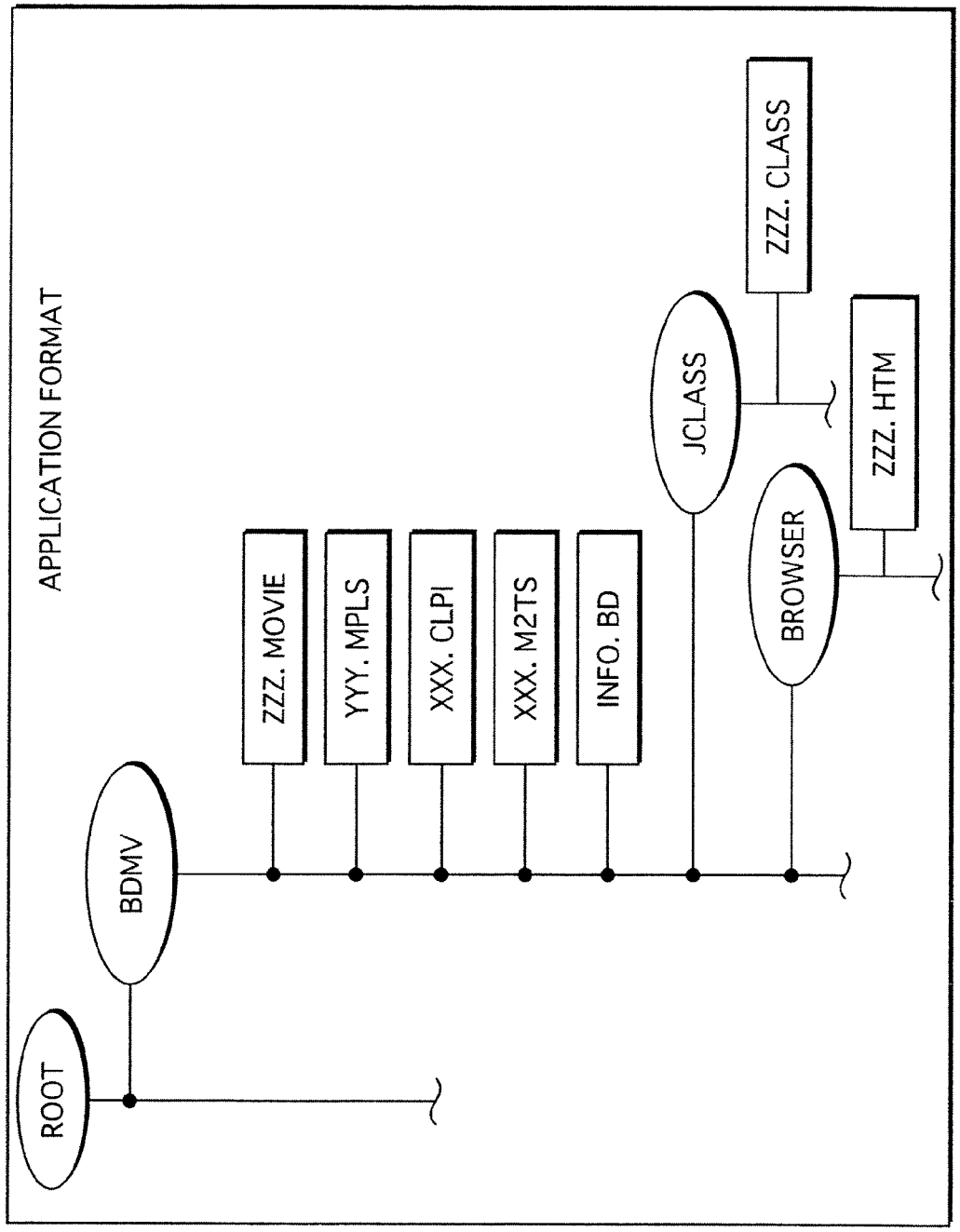
FIG. 4 represents an application format of a BD-ROM using a directory structure.

FIG. 4 expresses an application layer format (hereinafter, simply "application format") of a BD-ROM using a directory structure. As shown in FIG. 4, below a ROOT directory in the BD-ROM is a BDMV directory, and below the BDMV directory is a JCLASS directory and a BROWSER directory.

Subordinate to the BDMV directory exist the following files: INFO.BD, XXX.M2TS, XXX.CLPI, YYY.MPLS, and ZZZ.MOVIE. Subordinate to the JCLASS directory is disposed ZZZ.CLASS, and subordinate to the BROWSER directory is disposed ZZZ.HTM.

Figure 5:
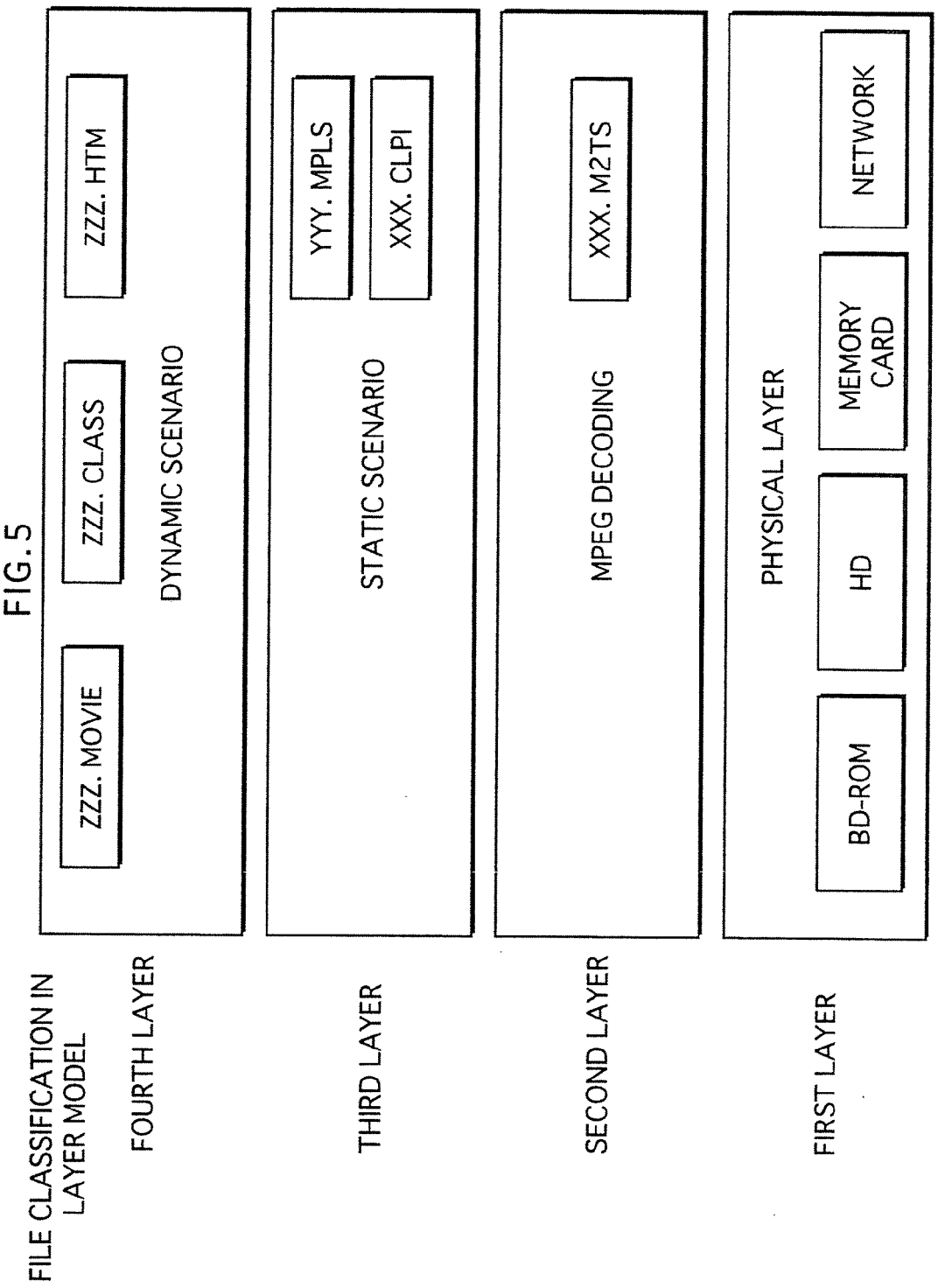
FIG. 5 is a classification diagram showing the files on the BD-ROM classified in terms of functionality.

FIG. 5 is a classification diagram of when these files are classified from a functionality viewpoint. In FIG. 5, the hierarchy formed from the first, second, third and fourth layers symbolically shows the classifications in the diagram. In FIG. 5, XXX.M2TS is grouped in the second layer. XXX.CLPI and YYY.MPLS are grouped in the third layer (static scenarios). ZZZ.MOVIE, which is subordinate to the BDMV directory, ZZZ.CLASS, which is subordinate to the JCLASS directory, and ZZZ.HTM, which is subordinate to the BROWSER directory, are grouped in the fourth layer.

Figure 6:
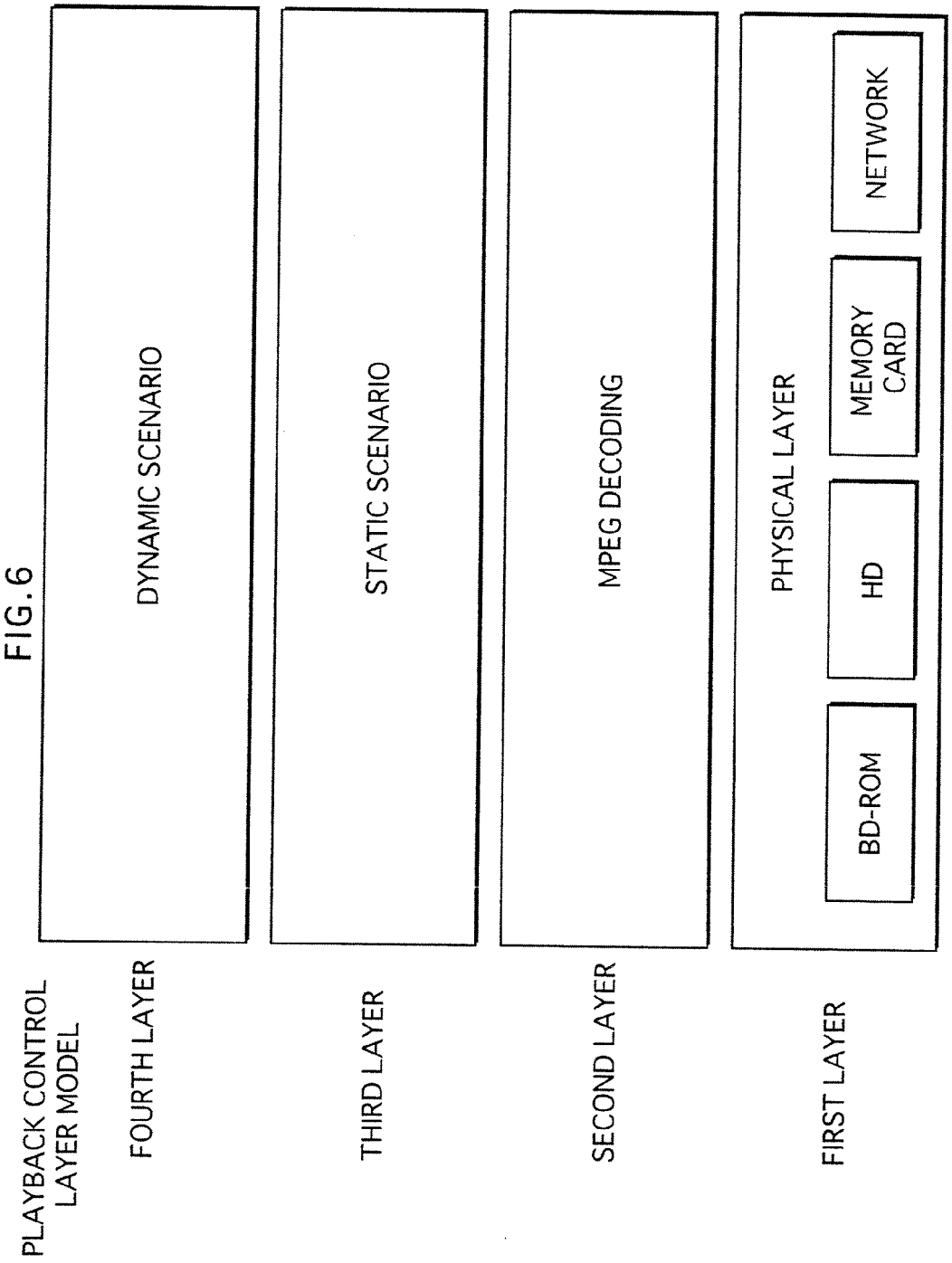
FIG. 6 shows a layer model that targets a BD-ROM.

The classification in FIG. 5 (first to fourth layer) target a layer model such as shown in FIG. 6. A layer model in control software that targets a BD-ROM is described below while referring to FIG. 6.

The first layer in FIG. 6 is a physical layer in which supply controls relating to streams targeted for processing are implemented. As shown in the first layer, target streams have as their supply source not only BD-ROMs but also HDs, memory cards, networks and other kinds of recording an communication media. Controls (disk access, card access, network communication) directed towards these HDs, memory cards, and networks are implemented on the first layer.

The second layer is a decoding form at layer. This second layer is where the decoding format used in decoding streams supplied by the first layer is defined. The MPEG-2 decoding format is employed in the present embodiment.

The third layer (static scenarios) defines the static scenarios of the streams. Static scenarios are playback path information and Clip information defined in advance by the disk creator, the third layer (static scenarios) being where playback controls based on these static scenarios are defined.

The fourth layer is for realizing dynamic scenarios in streams. Dynamic scenarios are scenarios for dynamically changing the progress of playback as a result of user operations, the device status, and the like, the fourth layer being where playback controls based on these dynamic scenarios are defined. Files relating to streams, static scenarios, and dynamic scenarios are described below in accordance with this layer model.

Firstly, an AVClip (XXX.M2TS) belonging to the second layer is described.

Figure 7:
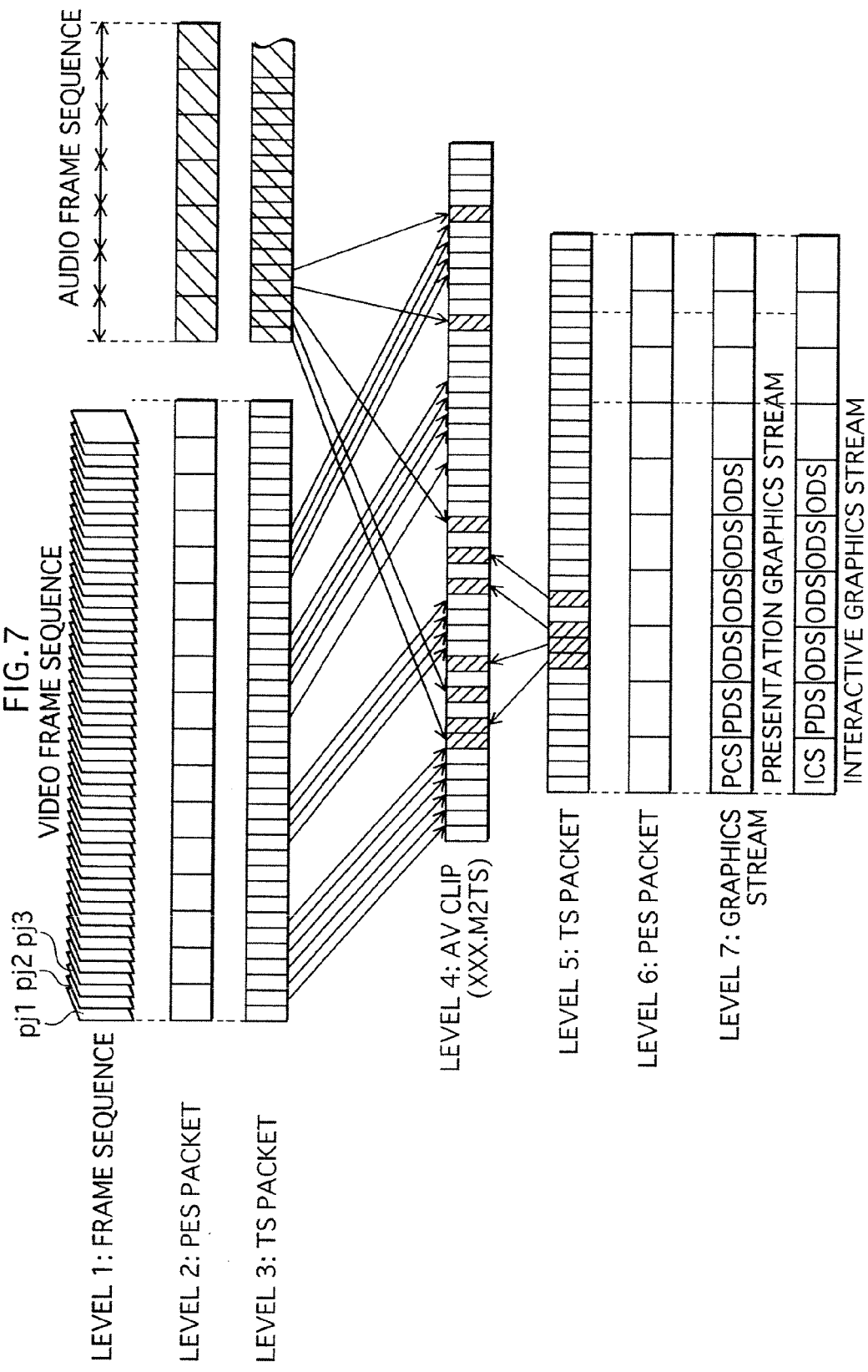
FIG. 7 schematically shows how an AV clip is structured.

AVClip (XXX.M2TS) is an MPEG-TS (Transport Stream) format digital stream obtained by multiplexing a video stream, one or more audio streams, and one or more graphics streams, being presentation graphics streams and interactive graphics streams. Video streams show the moving image portions of a movie, audio streams show the audio portions of a movie, presentation graphics streams show the subtitles of a movie, and interactive graphics streams show procedures in dynamic playback control that target menus. FIG. 7 schematically shows how an AVClip is constituted.

An AVClip (4th level) is formed by converting a video stream comprising a plurality of video frames (pictures pj1, pj2, pj3) and an audio stream comprising a plurality of audio frames (1st level) into a PES packet string (2nd level), which is then converted to the TS packets (3rd level). Likewise, a subtitle-related presentation graphics stream and a dialogue-related interactive graphics stream (7th level) are converted to a PES packet string (6th level), which is converted to TS packets (5th level), and the TS packets are then multiplexed.

The presentation graphics streams are graphics streams that compose subtitles of different languages, presentation graphics streams existing for a plurality of languages such as English, Japanese, and French. A presentation graphics stream is composed of a series of functional segments: a PCS (Presentation Control Segment), a PDS (Pallet Define Segment), a WDS (Window Define Segment), an ODS (Object Define Segment), and an END (END of Display Set Segment). The ODS (Object Define Segment) defines the graphics object that is a subtitle.

The WDS (Window Define Segment) defines the rendition area of the graphics object on the screen, and the PDS (Pallet Define Segment) defines color to be used in rendering the graphics object. The PCS (Presentation Control Segment) defines page control for subtitle display. This page control includes Cut-In/Out, Fade-In/Out, Color Change, Scroll, and Wipe-In/Out, and in conjunction with page control according to the PCS, enables effects such as displaying a next subtitle while a presently-displayed subtitle is gradually faded away to be realized.

An interactive graphics stream is a graphics stream that realizes dialogue control. Dialogue control defined by the interactive graphics stream is compatible with dialogue control in a DVD playback apparatus. The interactive graphics streams is composed of functional segments called an ICS (Interactive Composition Segment), a PDS (Palette Definition Segment), an ODS (Object Definition Segment), and an END (END of Display Segment). The ODS (Object Definition Segment) defines a graphics object. A plurality of such graphics objects are used to render buttons on a dialogue screen. The PDS (Palette Definition Segment) defines color to be used in rendering the graphics object. The ICS (Interactive Composition Segment) realizes changes in the state of the buttons in response to user operations. The ICS includes a button command to be executed when a confirmation operation is performed with respect to the button.

Thus completes the elementary streams that are multiplexed on AVClips. AVClips generated through the above process are partitioned into a plurality of extents and recorded in an area of a BD-ROM, as is the case with normal computer programs. An AVClip comprises one or more ACCESS UNITs, and can be cued in these ACCESS UNITs. An ACCESS UNIT is the smallest decoding unit that includes a single GOP (Group of Pictures) and audio frames to be read at the same time as the GOP. GOPs include Bidirectionally Predictive (B) pictures, which are compressed using time-correlation characteristics with images to be played in a past direction and a future direction, Predictive (P) pictures, which are compressed using time-correlation characteristics with images to be played in a past direction, and Intra (I) pictures, which are compressed using frequency-correlation characteristics (i.e. not time-correlation characteristics) in the images of individual frames.

Moreover, the filename "XXX" in XXX.M2TS abstracts the 3-digit identification number appended to the AVClip in the BD-ROM. That is, the AVClip in FIG. 7 is uniquely identified using the "XXX". This completes the description of the stream (XXX.M2TS). It should be noted that the 3-digit number referred to here is merely exemplary, and may be any length.

Static Scenarios

Static scenarios files (XXX.CLPI, YYY.MPLS) are described below.

Figure 8:
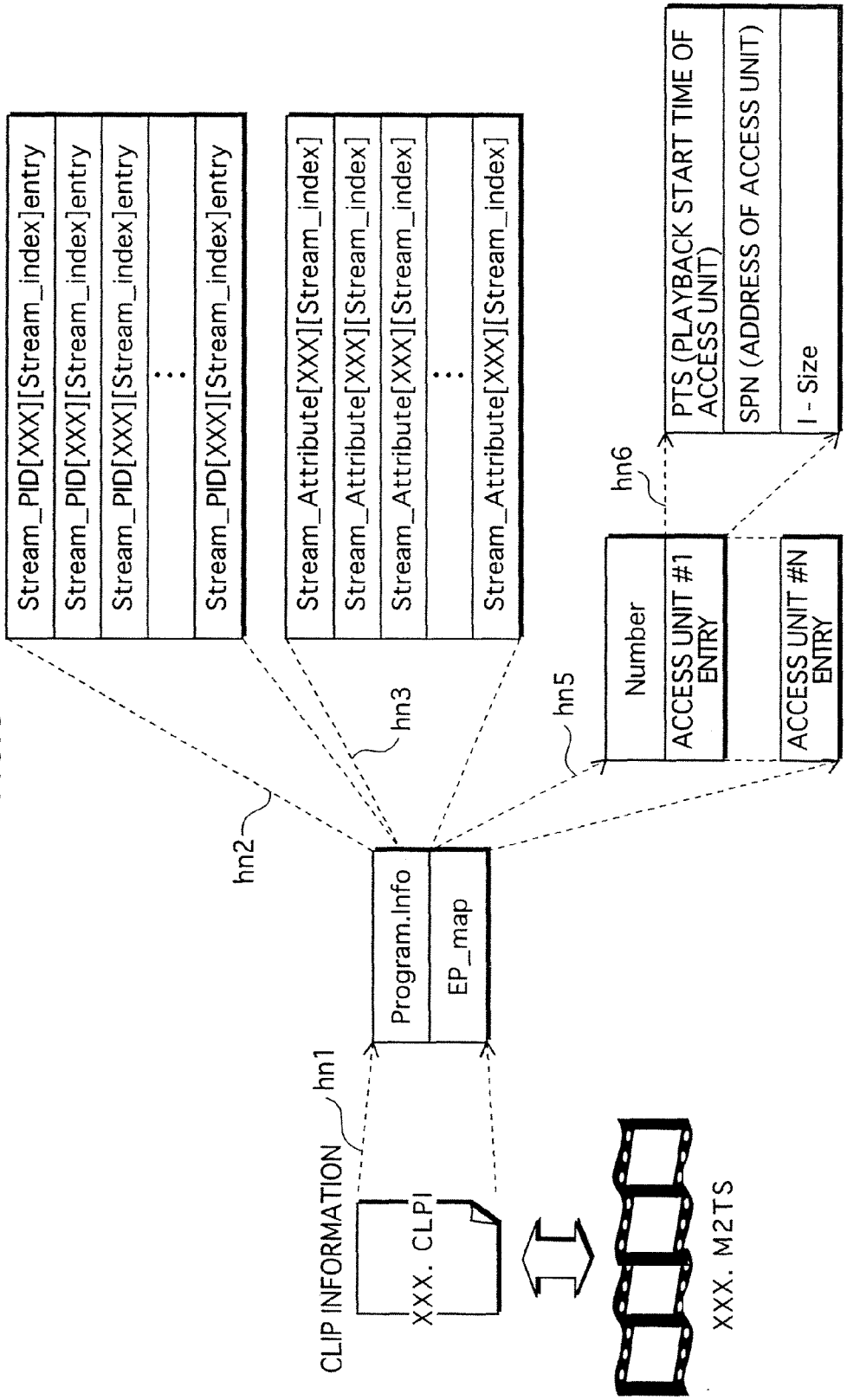
FIG. 8 shows an internal structure of Clip information.

Clip information (XXX.CLPI) is management information relating to individual AVClips. FIG. 8 shows an internal structure of Clip information. AVClips are obtained by multiplexing video and audio streams, and since AVClips can be cued in ACCESS UNITs, management items of the Clip information includes the attributes of the video and audio streams and where the cue positions are in the AVClips. The leaders in FIG. 8 highlight the Clip information structure. As shown by the leader hn1, Clip information (XXX.CLPI) comprises "Program Info." and "EP_map", which is a reference table for cueing ACCESS UNITs.

"Program info" is information showing the PID and attributes of each of a plurality of elementary streams multiplexed on the AVClip, in correspondence with stream_index. stream_index is an index of the elementary streams multiplexed on an AVClipxxx to which the present Clip information corresponds. Supposing that the AVClip that corresponds to the present Clip information is AVClipxxx, the PIDs of the elementary streams identified in stream_index are the plurality of stream PID [xxx][stream_index]entry shown by the dashed arrow hn2.

Attributes of the elementary streams are shown by a plurality of stream_Attribute[xxx][stream_index] shown by the dashed arrow hn2. These attributes include Video attribute, Audio attribute and Graphics attribute. The Video attribute indicates the compression format used to compress the video stream (Coding), and the resolution (Resolution), the aspect ratio (Aspect) and the frame rate (Framerate) of individual pieces of picture data structuring the video stream. On the other hand, the Audio attribute indicates the compression format used to compress the respective audio stream (Coding), the channel number (Ch.) and corresponding language (Lang) of the respective audio stream. The attributes of a particular elementary stream can be found from the Program Info. via the stream_index.

EP_map is a reference table for referring indirectly to the addresses of a plurality of cue positions using time information, and, as shown by the leader hn5, comprises plural pieces of entry information (ACCESS UNIT#1 entry, ACCESS UNIT#2 entry, ACCESS UNIT#3 entry, . . . ) and an entry number (Number). Each entry, as shown by the leader hn6, indicates a playback start time of a corresponding ACCESS UNIT in correspondence with an address and the size (I-size) of the head I-picture in the ACCESS UNIT. The playback start time of the ACCESS UNIT is expressed as a timestamp (Presentation Time Stamp) of picture data positioned at the head of the ACCESS UNIT. Also, the addresses in the ACCESS UNITs are expressed by the serial numbers of TS packets (SPN (Source Packet Number)). Since a variable-length coding compression format is employed, it is possible to cue from an arbitrary playback time to a piece of picture data in an ACCESS UNIT corresponding to the playback time by referring to the entry of the ACCESS UNIT, even when sizes and playback times of ACCESS UNITs that includes GOPs are not uniform. Moreover, the filename "XXX" of XXX.CLPI uses the same name as the AVClip to which the Clip information corresponds. In other words, the filename of the Clip information in FIG. 8, being "XXX", corresponds to AVClip (XXX.M2TS). Thus concludes the description of Clip information. PlayList information is described next.

Figure 9:
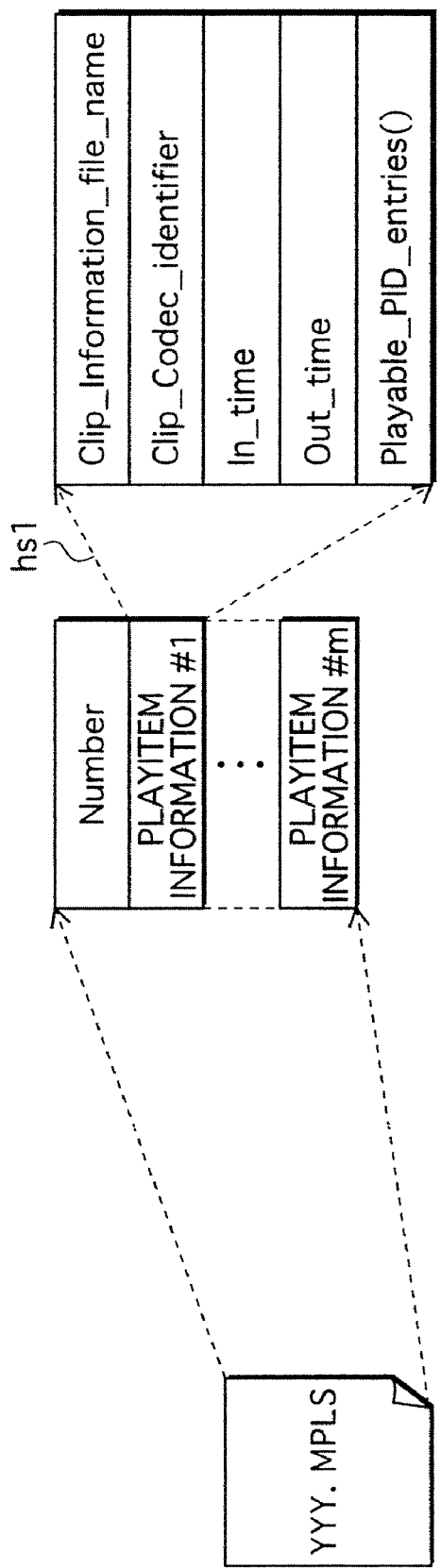
FIG. 9 shows an internal structure of PL information.

YYY.MPLS (PlayList information) is a table structuring a PlayList, which is playback path information, and comprises plurality pieces of PlayItem information (PlayItem information #1, #2, #3, . . . , #n), and a PlayItem information number (Number). FIG. 9 shows an internal structure of PL information. PlayItem information is pointer information that defines one or more playback logical sections structuring a PlayList. The structure of PlayItem information is highlighted by the leader hs1. PlayItem information is, as shown by the leader hs1, structured from a "Clip_Information_file_name" indicating the filename of playback section information relating to an AVClip to which the In-point and Out-point of a playback section belong, a "Clip_Codec_identifier" showing the encoding form used to encode the AVClip, an "In_time", which is time information showing the start of a playback section, an "Out_time", which is time information showing the end of a playback section, and a "Playable_PID_entries".

Figure 10:
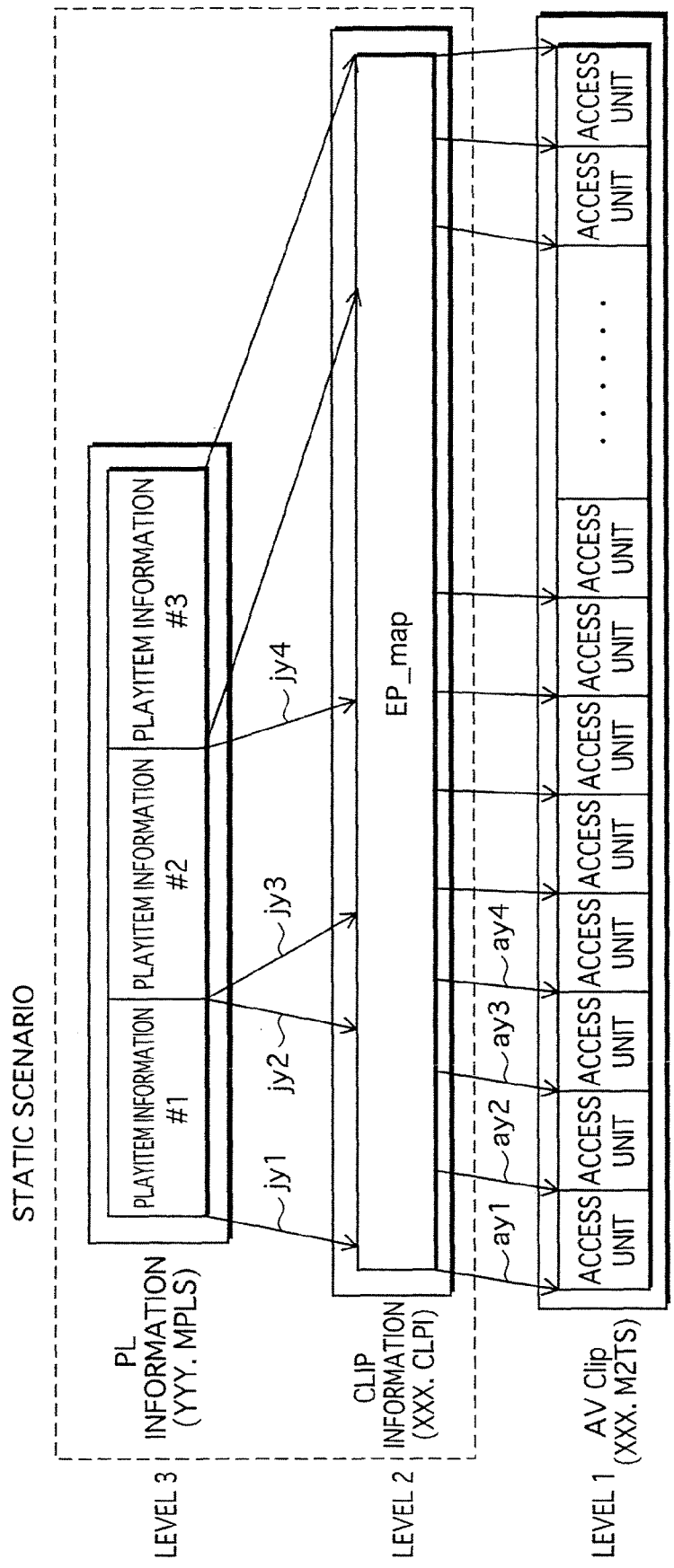
FIG. 10 schematizes indirect referencing using PL information.

A characteristic of PlayItem information is the notation. That is, playback sections are defined by an indirect referencing format that uses an EP_map as a reference table. FIG. 10 schematizes indirect referencing using PL information. The AVClip in FIG. 10 is structured from a plurality of ACCESS UNITs. The EP_map in the Clip information specifies the sector addresses of the ACCESS UNITs, as shown by the arrows ay1, ay2, ay3 and ay4. Arrows jy1, jy2, jy3 and jy4 in FIG. 10 schematically show the referencing of ACCESS UNITs using PlayItem information. In other words, this shows that referencing by PlayItem information (jy1, jy2, jy3, jy4) involves indirect referencing in which the addresses of ACCESS UNITs includes in the AVClip are specified via the EP_map.

Figure 11:
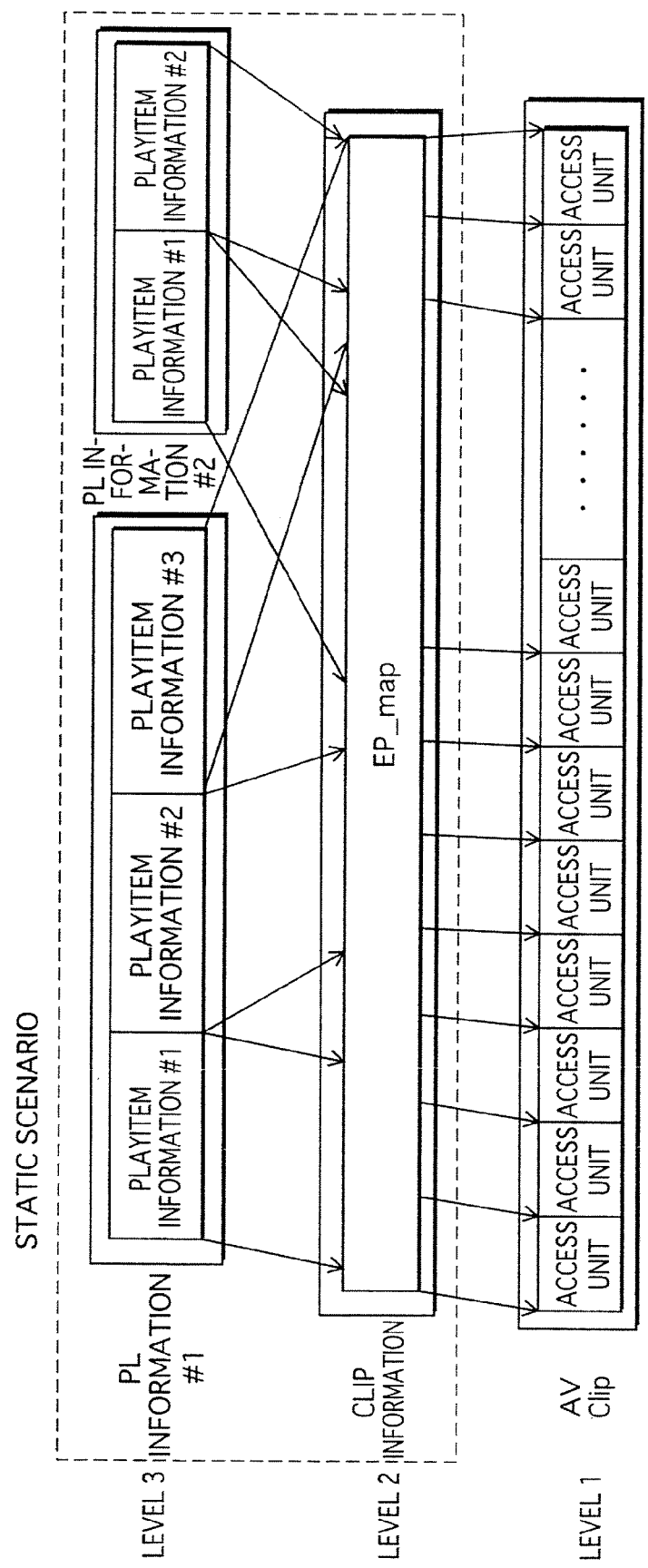
FIG. 11 shows an example of a different piece of PL information (PL info#2) to that (PL info#1) in FIG. 10 being defined.

Playback sections on BD-ROM formed from groupings of PlayItem information, Clip information and AVClips are called "PlayItems". Playback units on a BD-ROM that are formed from groupings of PL information, Clip information and AVClips are called "PlayLists" (abbreviated as "PL"). Movie works recorded on a BD-ROM are structured in these logical playback units (PLs). Since movie works on a BD-ROM are structured in logical playback units, it is possible to easily create, as distinct from the main movie work, movie works from scenes in which only certain characters appear, for instance, by defining the PLs specifying these scenes. FIG. 11 shows an example of when a different PL (PL information #2) to the PL (PL information #1) shown in FIG. 10 is defined.

The greatest merit of static scenarios is being able to increase the range of a moviemaker's expression, since the variations of a movie work increase simply by defining different pieces of PL information. There are, in addition to PLs and PlayItems, playback units in BD-ROM called Chapters. Chapters are structured from one, two, or more PlayItems.

Also, the filename "YYY" of PL information abstracts the 3-digit identification number appended to the PL information in a BD-ROM. That is, the PL information in FIG. 11 is uniquely identified using the identification number YYY. Expressing the identification number of PL information "YYY" shows that this identification number is a different numbering system to the identification number XXX of the AVClip and Clip information (the 3-digit number used here is merely exemplary, and may be any number of digits).

This concludes the description of static scenarios. Dynamic scenarios are described next.

Dynamic Scenarios

Figure 12:
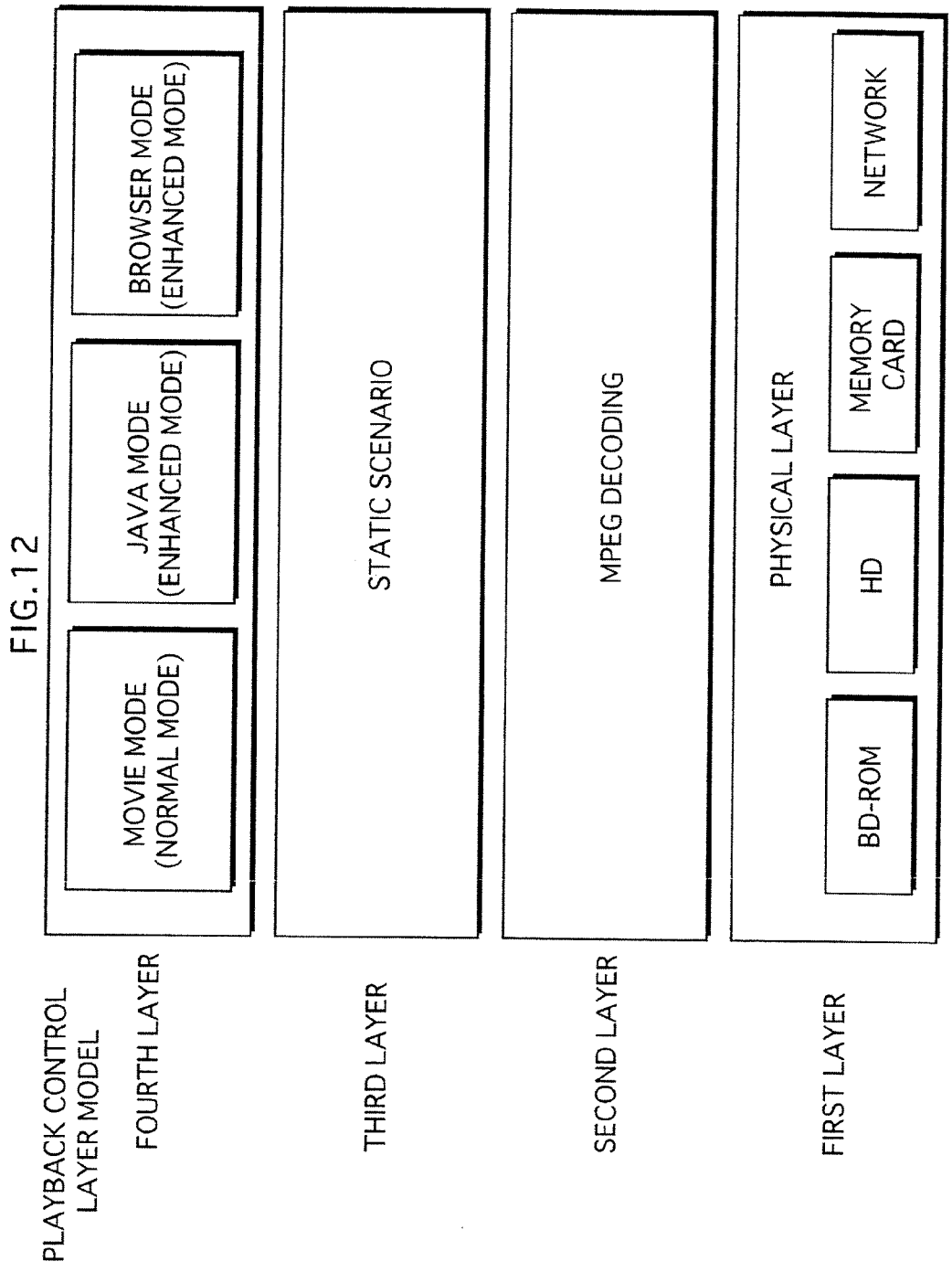
FIG. 12 shows playback modes in a fourth layer of the layer model.

Dynamic scenarios are command strings showing dynamic playback control procedures relating to AVClips. Dynamic playback control procedures change in response to user operations with respect to a device, and are similar to computer programs in character. Here, dynamic playback controls have two modes. One of the two modes is for playing video data recorded on BD-ROM (normal mode) and the other mode is for enhancing the added value of video data recorded on BD-ROM (enhanced mode) in a playback environment specific to AV devices. FIG. 12 shows playback modes on the fourth layer of the layer model. One normal mode and two enhanced modes are described on the fourth layer in FIG. 12. The normal mode, called a MOVIE mode, is a playback mode for a DVD-like environment. Of the two enhanced modes, the first, called a Java mode, is a playback mode used mainly with Java virtual machines. The second enhanced mode, called a Browser mode, is a playback mode used mainly with browsers. Since there are three modes on the fourth layer (i.e. the MOVIE mode, Java mode and Browser mode), it is preferable to describe the modes with which dynamic scenarios can be executed.

Note that the file body "ZZZ" in the file names "ZZZ.MOVIE", "ZZZ.CLASS", AND "ZZZ.HTM" abstracts the 3-digit identification number given to the dynamic scenario in the BD-ROM. In other words, the scenario in FIG. 12 is uniquely identified using this identification number ZZZ. Expressing the identification number of the scenario as "ZZZ" shows that this identification number is a different numbering system to the identification number XXX of the AV stream and the identification number YYY of the PL information (the 3-digit number used here is merely exemplary, and may be any number of digits).

The following describes dynamic scenarios in each mode in more detail.

"ZZZ.MOVIE" is a dynamic scenario that targets MOVIE mode. This dynamic scenario has the playback apparatus execute playback control like that of existing DVD playback apparatuses.

"ZZZ.HTM" is a dynamic scenario that targets Browser mode. Control procedures for accessing a site on a network and downloading a file can be written in this dynamic scenario. While there are two operation modes in enhanced mode, specifically, Java mode and Browser mode, an explanation with respect to both these operation modes would be complicated. Therefore, for the sake of brevity, the following description of a dynamic scenario in enhanced mode will be given with respect to Java mode only.

Figure 13:
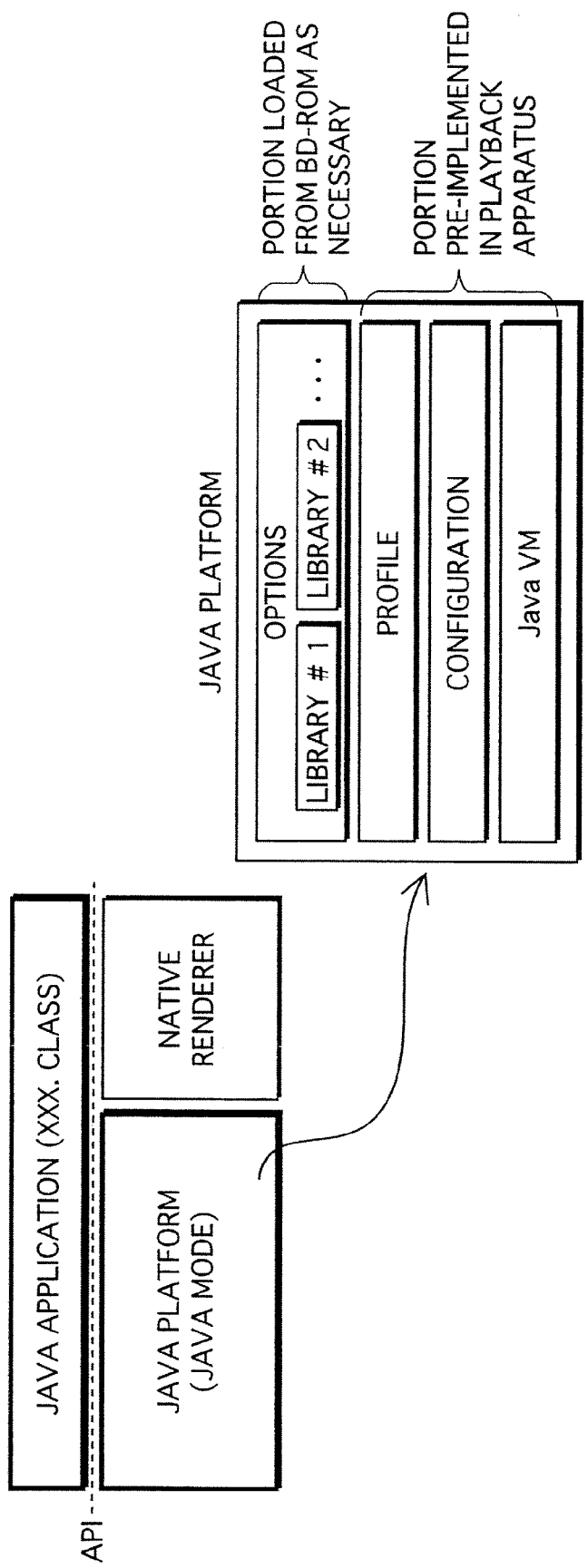
FIG. 13 shows a layer model of a Java platform that Java language targets.

"ZZZ.CLASS" is a dynamic scenario that targets Java mode, and is a Java language application program. Since "ZZZ.CLASS" is a Java language application program, a Java platform is a main execution body of dynamic scenarios Java mode. The following describes the relationship between a Java mode application and a Java platform in more detail with reference to FIG. 13. FIG. 13 shows a layer model of a Java platform that Java language targets. The Java mode application is located on the top layer of this layer model. An API (Application Interface) exists subordinate to Java mode application. The API in the present embodiment is a library Java.awt for rendering characters. The Java platform is on the layer subordinate to the API. The native renderer is a graphics rendition function that is included in the playback apparatus, and is on the same layer as the Java platform.

The Java platform is composed of a "Java virtual machine (Java VM)", a "configuration", a "profile", and "options". The virtual machine converts Java mode applications written in Java language into native codes of the CPU of the playback apparatus, and has the CPU execute the native codes. The configuration realizes simple input and output in the playback apparatus. The profile performs IP communication, rendition of graphics, and so on in the playback apparatus.

"Options" include various libraries. These libraries supply various functions to the Java mode application that are not supplied from the Java platform. Specifically, processing for security assurance and input/output between the BD-ROM and the Java application in the playback apparatus are stipulated in this library. In this way, since programs for rendering text and performing simple input and output are provided in the Java platform, rendering of subtitles according to presentation graphics streams and buttons according to interactive graphics streams interferes with rendering according to Java objects. In the present embodiment, PlayItems are given the filter specification function in order to avoid such interference caused by presentation graphics streams and interactive graphics streams.

This filter specification is for distinguishing, out of the plurality of elementary streams multiplexed on the AVClip, which are playable and which are unplayable. Out of the information elements shown in FIG. 9, it is the Playable_PID_entries that realize this filter specification.

Figure 14A:
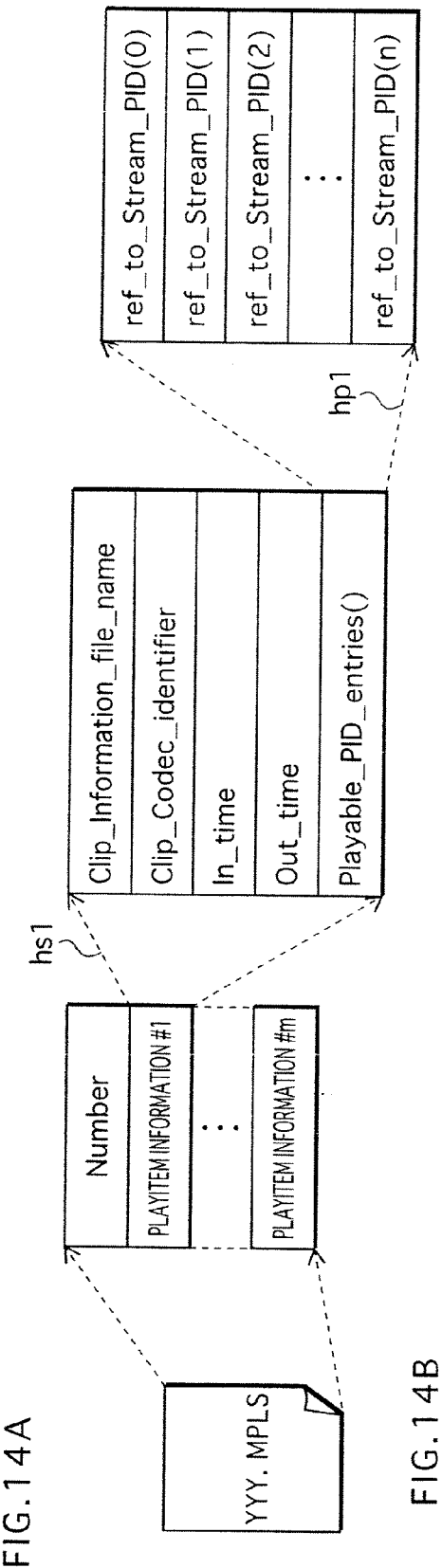
FIG. 14 shows an internal structure of Playable_PID_entries.

The following describes Playable_PID_entries in more detail. FIG. 14A shows the internal structure of the Playable_PID_entries. The leader hp1 in FIG. 14A highlights the structure of the Playable_PID_entries. The Playable_PID_entries is composed of a plurality of ref_to_stream_PID[ ]. Each ref_to_stream_PID[ ] is a 16-bit field that has a value showing one stream_PID[xxx][stream_index]entry defined in the program Info of the Clip information. The filter specification function of the PlayItems is realized by having the ref_to_stream_PID instruct each stream_PID[xxx][stream_index]entry.

Figure 14B:
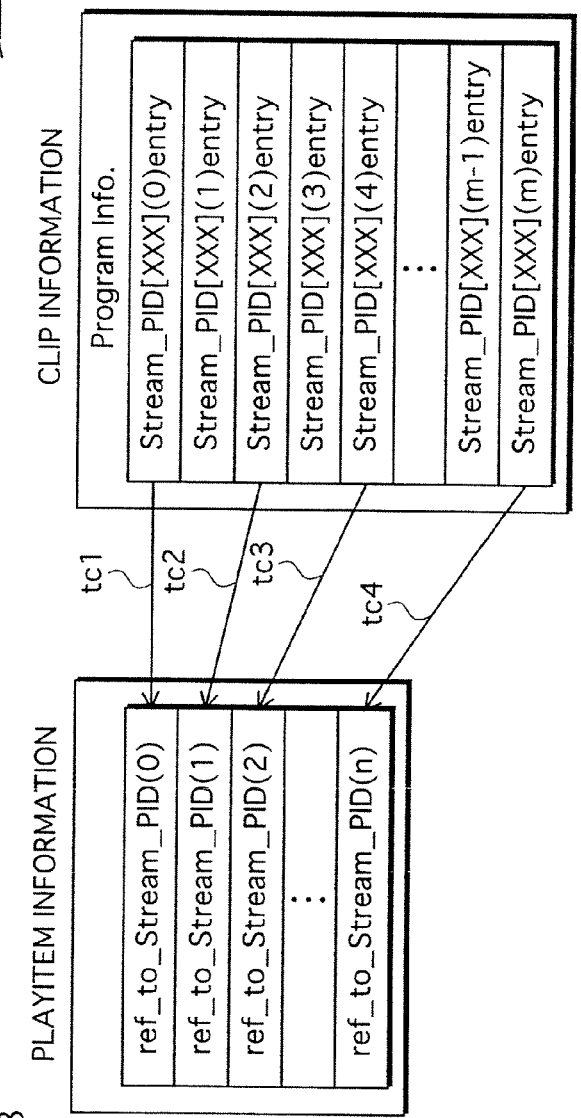

FIG. 14B shows the correspondence between each stream_PID[xxx][stream_index]entry defined in the program Info of the Clip information, and each ref_to_stream_PID in the PlayItem information. Suppose that m+1 PID entries exist in the program Info of the Clip information (stream_PID[xxx][0]entry, stream_PID[xxx][1]entry, stream_PID[xxx][2]entry, . . . , stream_PID[xxx][m]entry). The arrows tc1, tc2, tc3 and tc4 in FIG. 14B show how selection is made of which PIDs shown by the m+1 PID entries are written in which Playable_PID_entries. As shown in FIG. 14B by the arrows tc1, tc2, tc3, and tc4, among the m+1 PID entries, the PIDs shown by stream_PID[xxx][0]entry, stream_PID[xxx][1]entry, stream_PID[xxx][2]entry, and stream_PID[xxx][m]entry are set in ref_to_stream_PID(0), ref_to_stream_PID(1), ref_to_stream_PID(2), and ref_to_stream_PID(n), respectively.

Figure 15:
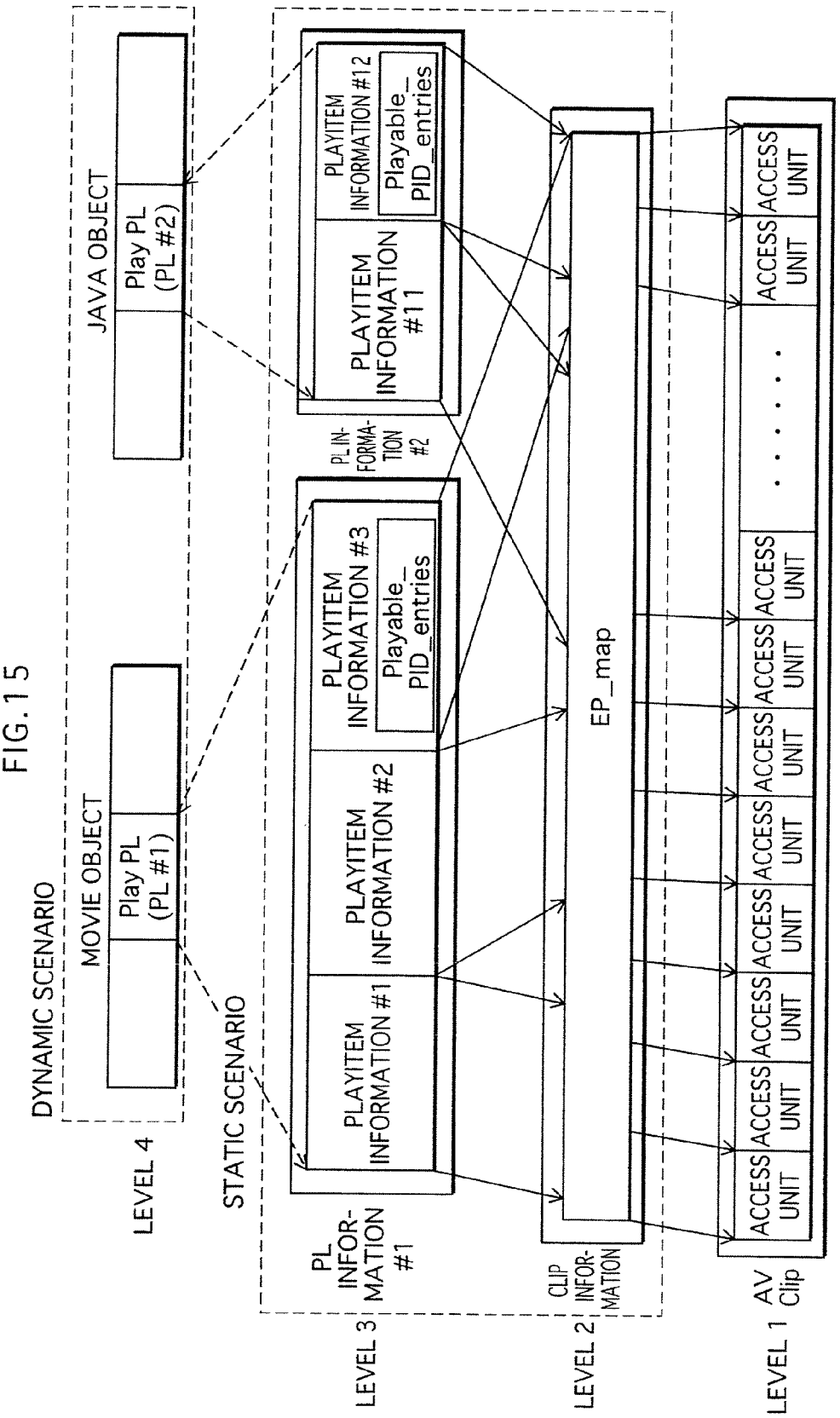
FIG. 15 shows a hierarchical structure of a PL with respect to which playback controls are performed by MOVIE and Java objects.

The following description relates to which playback controls are realized by filter specification in PlayItems. FIG. 15 shows the hierarchical structure of PLs in which playback control is performed by MOVIE objects and Java objects. FIG. 15 is the hierarchical structure shown in FIG. 10, which is composed of the first level (AV-Clip), the second level (Clip information), and the third level (PL information), with the addition of a fourth level. The MOVIE object at level 4 in FIG. 15 includes a command (PlayPL(PL#1)) for having PL#1 played. Out of the three PlayItems #1, #2 and #3 structuring the PL#1, PlayItem#3 includes Playable_PID_entries, meaning that filter specification is possible.

The Java object at level 4 in FIG. 15 includes a command (PlayPL(PL#2)) for having PL#2 played. PlayItem#12 of the two PlayItems #11 and #12 structuring PL#2 includes Playable_PID_entries, meaning that filter specification is possible.

Figure 16:
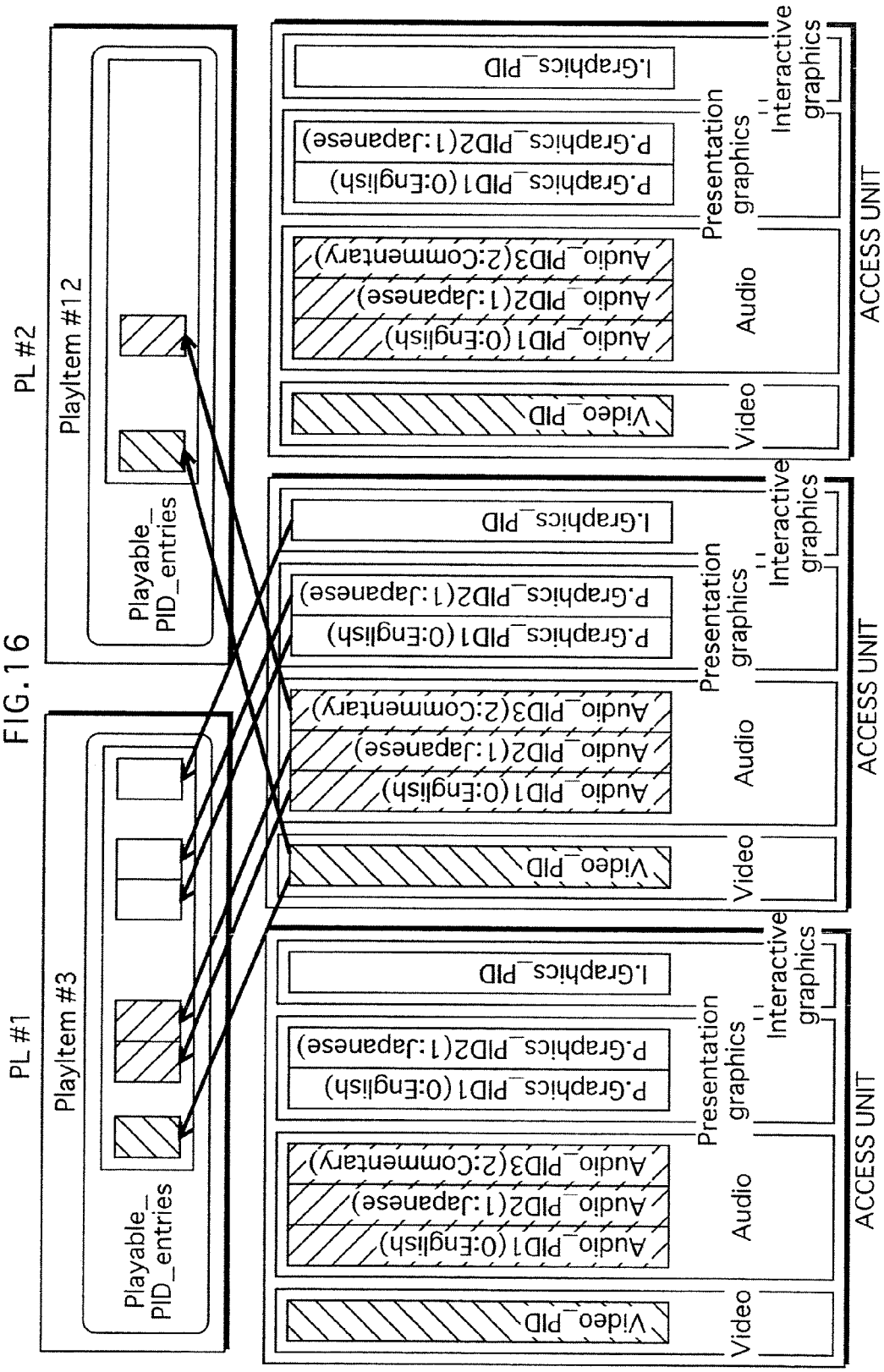
FIG. 16 shows how filter specifications are performed as a result of Playable_PID_entries in PlayItems #3 and #12.

FIG. 16 shows which filter specifications are performed by Playable_PID_entries in PlayItems #3 and #12. In FIG. 16, ACCESS UNITs structuring an AVClip are shown at the bottom, and two PlayItems #3 and #12 are shown at the top. One video stream, three audio streams, two presentation graphics streams, and one interactive graphics stream are multiplexed in the ACCESS UNITs. A "Video_PID" PID is appended to the video streams, "Audio_PID" PIDs are appended to the audio streams, "P.Graphics_PID" PIDs are appended to the presentation graphics streams, and "I.Graphics_PID" PIDs are appended to the interactive graphics streams. Of the three audio streams, the one having "Audio_PID1" appended is English audio (0:English), the one having "Audio_PID2" appended is Japanese audio (1:Japanese), and the one having "Audio_PID3" appended is Commentary audio (2:Commentary). Of the two presentation graphics streams, the one having "P. Graphics_PID1" appended is English audio (0:English), and the one having "P.Graphics_PID2" appended is Japanese audio (1:Japanese).

PlayItems #3 and #12 at the top of FIG. 16 have different filter specifications. The enumeration of squares in PlayItems #3 and #12 are the actual content of Playable_PID_entries, PlayItem #3 being set to allow playback of the Video_PID video stream, the Audio_PID1 and Audio_PID2 audio streams, the P.Graphics_PID1 and P. Graphics_PID2 presentation graphics streams, and the I.Graphics_PID interactive graphics stream. PlayItem #12 is set to allow playback of the Video_PID video stream, and the Audio_PID3 audio stream. When playing PlayItem#3, Playable_PID_entries in PlayItem #3 are set to a demultiplexer in the playback apparatus. As a result, the demultiplexer outputs the Video_PID video stream to a video decoder, outputs the Audio_PID1 and Audio_PID2 audio streams to an audio decoder, and outputs the P.Graphics_PID1 and P.Graphics_PID2 presentation graphics streams as well as the I.Graphics_PID interactive graphics stream to a graphics decoder. Since PlayItem#3 is set so that all of the graphics streams are playable, playback of all of the graphics streams multiplexed on the AVClip is possible.

On the other hand, since PlayItem#12 is set so that not all of the graphics streams are playable, control using Java language is possible without there being interference from dynamic scenarios in Java mode.

Figure 17:
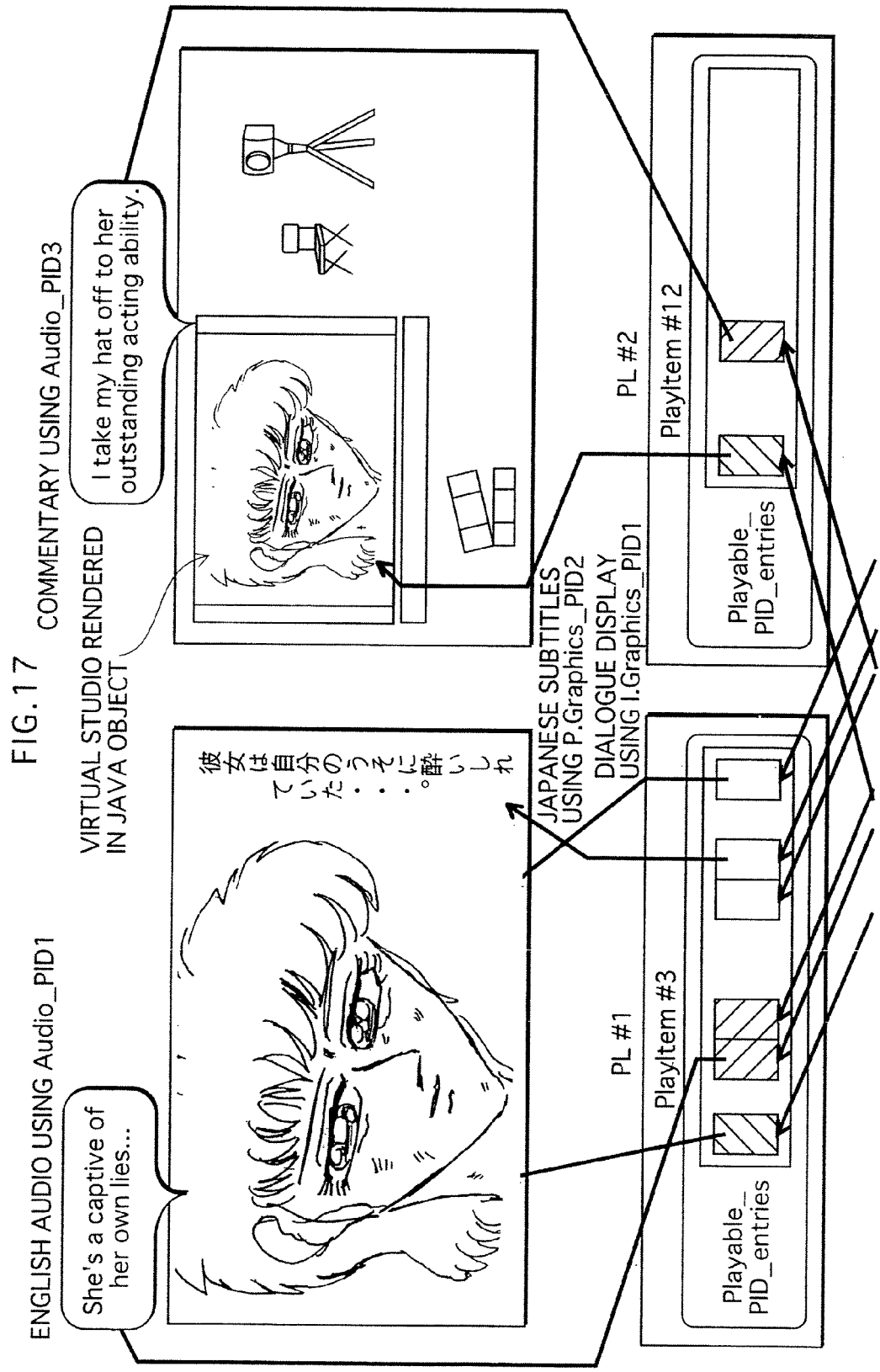
FIG. 17 shows how playback output is made possible by Playable_PID_entries in PlayItems #3 and #12.

FIG. 17 shows possible playback outputs resulting from Playable_PID_entries in PlayItem #3. Since playback of the Video_PID video stream, the Audio_PID1 and Audio_PID2 audio streams, the P.Graphics_PID1 and P.Graphics_PID2 presentation graphics streams, and the I.Graphics_PID interactive graphics stream is possible with PlayItem #3, it is possible with playback using MOVIE objects to perform playback outputs of video stream following the playback output of the Audio_PID1 audio stream (i.e. the narration "She's a captive of her own lies" in FIG. 17), the P.Graphics_PID1 presentation graphics stream (the Japanese subtitle "彼女は自分のうそに酔いしれた") and the I.Graphics_PID interactive graphics stream (CONTINUE?●YES ◎NO).

PlayItem#12 is set so that not all of the graphics streams are playable, making it possible to only perform playback output of two streams; namely, the Video_PID videostream and the Audio_PID3 audio stream. If the Java object instructing the playback of this PlayItem draws a virtual studio (i.e. the room containing a camera, chair and light in FIG. 17), the Java object for performing the drawing will receive no interference from commands included in the graphics streams. It is thus possible to realize Java-mode specific processing, while avoiding interference from commands included in graphics streams. The Audio_PID3 audio stream set to playable by PlayItem#12 is a commentary by the movie director (i.e. the lines "I take my hat off to her outstanding acting ability"), and by having such commentary by the director played in the virtual studio, it is possible to create the atmosphere of a movie set.

As a result of this Java object, it is possible to listen to the movie director's comments while playing movie scenes as background images in a room modeled on a movie studio.

By recording this Title on a BD-ROM as a bonus track Title, the product value of the BD-ROM can be increased. Using the filter specification in a PlayItem to record the bonus track Title on the BD-ROM brings about the following merits.

The commentary of world-renown movie director is of definite interest to movie buffs, and exists on currently available DVDs as something that increases the added value of the movie work.

While being able to listen to the director's commentary is the greatest attraction of this Title, playing movie scenes as background images also helps to increase the Title's attractiveness. In other words, being able to listen to behind-the-scenes talk relating to the movie production while viewing highlight scenes from the movie increases the aura of the commentary. The problem in this case becomes one of how to handle audio streams relating to the commentary. The orthodox approach would be to provide movie scenes that one wants to use as background images separately from the main feature, and to multiplex these with audio streams so as to create the bonus track. However, this approach means that movie scenes for use as background images need to be recorded on the BD-ROM separately from the main feature, increasing the number of recording items and creating capacity-related problems.

Another possible method involves multiplexing audio streams for the commentary on video streams for the main feature together with audio streams used in the main feature. This allows scenes from the main feature to be used as background images to the commentary, although the danger here is that the commentary data will also be heard when playing the main feature. As such, the filter specification in the PlayItem structuring the main feature Title is set so that only the audio stream of the commentary is OFF and any remaining audio streams are ON. On the other hand, the filter specification in the PlayItem structuring the bonus Title is set so that only the audio stream of the commentary is ON and any remaining audio streams are OFF. By doing this, it is preferable to multiplex all audio streams relating to the main feature and commentary together on a single AVClip for recording on a BD-ROM.

Since it is not necessary to create separate AVClips for the commentary and main feature (i.e. an AVClip only for audio streams of the main feature, and an AVClip only for audio streams of the commentary), it is possible to reduce the number of AVClips for recording on a BD-ROM, and make authoring easier.

The reason for providing Playable_PID_entries in PlayItems is that PlayItems have two properties: exclusivity to one AVClip, and nonexclusivity. Exclusivity to one AVClip is the property of being set with respect to only one AVClip, and not being set with respect to two or more AVClips. Due to this exclusivity, filter specification by the Playable_PID_entries is effective only when playing the corresponding one AVClip, and is not effective when playing of other AVClips. Because PlayItems, which have these properties, are given the Playable_PID_entries, the playback apparatus can select elementary streams consistently even if there is a disparity in the number of multiplexed elementary streams between AVClips structuring one movie work. Here, disparity in the number of elementary streams multiplexed on AVClips denotes the number of multiplexed elementary streams differing between AVClips that correspond to action scenes or the like and AVClips that correspond to conversation scenes or the like. That is, lines of the script and narration do not exist at all in AVClips that correspond to action scenes. The audio necessary for such scenes is that such as background music, the sound of a car accelerating, or the sound of an explosion, and it is sufficient to play the audio singularly. Therefore, it is unnecessary to provide audio of various languages or subtitles for AVClips of such scenes, the only elementary streams needing to be multiplexed on such an AVClip being those corresponding to the video and audio. On the other hand, lines, narration and the like are necessary for AVClips corresponding to conversation scenes, and therefore, the audio of the lines of such scenes must be expressed with audio and subtitles of various languages. For this reason, elementary streams corresponding to video, and elementary streams of audio and subtitles of various languages must be multiplexed on AVClips of such scenes.

Figure 18:
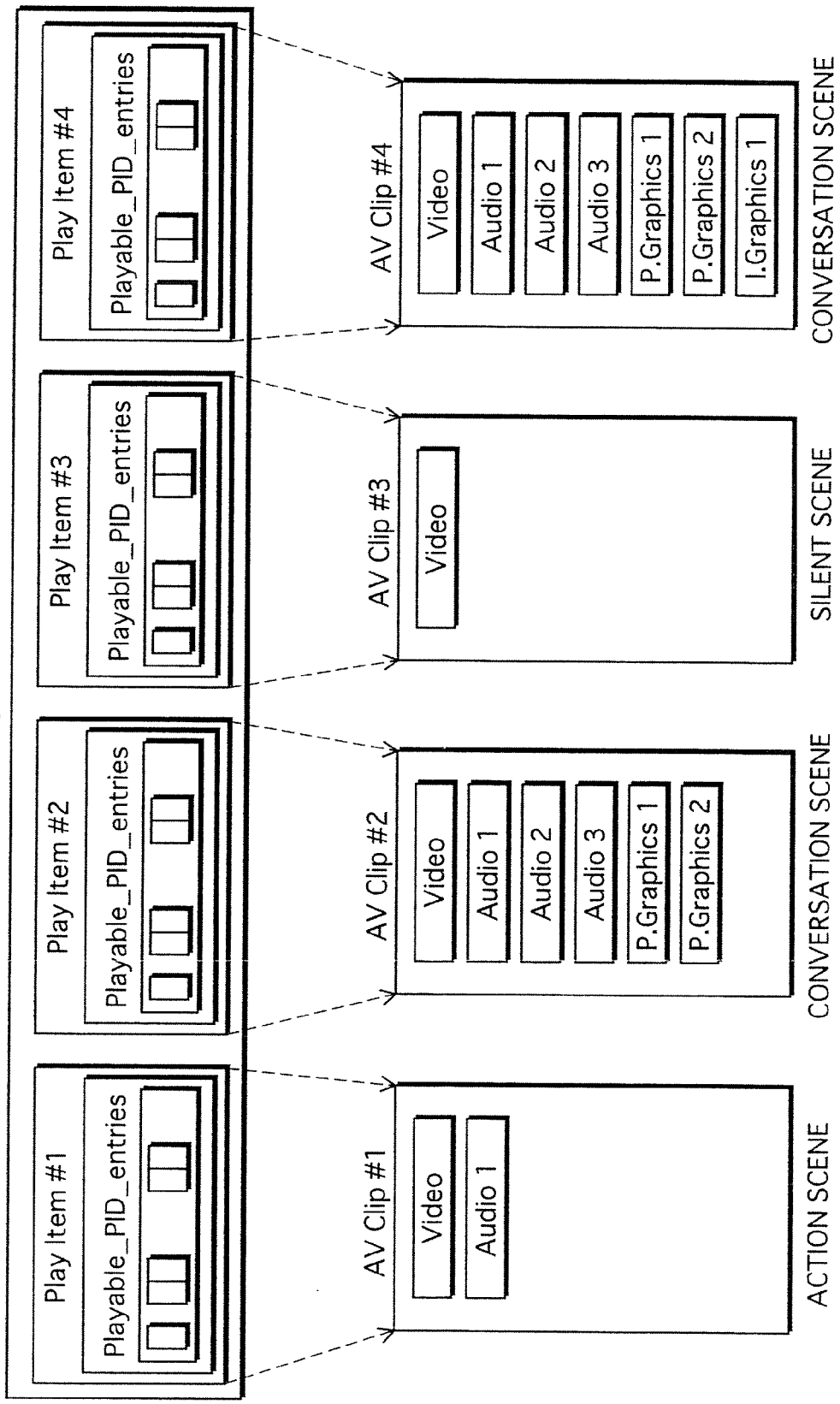
FIG. 18 shows disparity between AV clips in the number of elementary streams multiplexed thereon.

FIG. 18 shows disparity in the number of multiplexed elementary streams between AVClips. In FIG. 18, AVClip#2 and AVClip#4 correspond to conversation scenes, and AVClip#1 and AVClip#3 correspond to action scenes. A video stream (Video) and one audio stream (Audio1) are multiplexed on AVClip#1. In addition to a video stream, three audio streams (Audio1, Audio2, Audio3), and two presentation graphics streams (P.Graphics1, P.Graphics2) are multiplexed on AVClip#2. Only a video stream is multiplexed on AVClip#3. A video stream, three audio streams (Audio1, Audio2, Audio 3), three presentation graphics streams (P.Graphics1, P.Graphics2, P.Graphics3), and one interactive graphics stream (I.Graphics1) are multiplexed on AVCLip#4.

If disparities in the number of multiplexed elementary streams occur as shown in FIG. 18, when playing each AVClip, the MOVIE mode or Java object must detect in advance which elementary streams are multiplexed on the AVClip, and which PIDs are assigned to the AVClip. Performing such a detection each time playback of a new AVClip is commenced is a burden for Java objects, and the detection may not be performed in time if the playback time of the AVClip is short. In view of this situation, Java objects are not permitted to select multiplexed elementary streams directly, but instead select elementary streams indirectly via the Playable_PID_entries in the PlayItems. That is, the PlayItem shows a specification of which elementary streams are to be played from among those in an AVClip to be newly played. Therefore, it is possible to have only the desired elementary streams played if the elementary streams to be played are selected by the playback apparatus via the PlayItem, rather than being directly selected by the Java object.

In this kind of indirect elementary stream selection, the act of selecting a PlayItem to be played is equivalent to the act of selecting an elementary stream that is multiplexed on an AVClip. By providing information showing filter specification in PlayItems and having Java objects select elementary streams via the filter specification, it is possible to consistently select elementary streams throughout units composed of a plurality of PlayItems, in other words, throughout large playback units (PLs).

Figure 19:
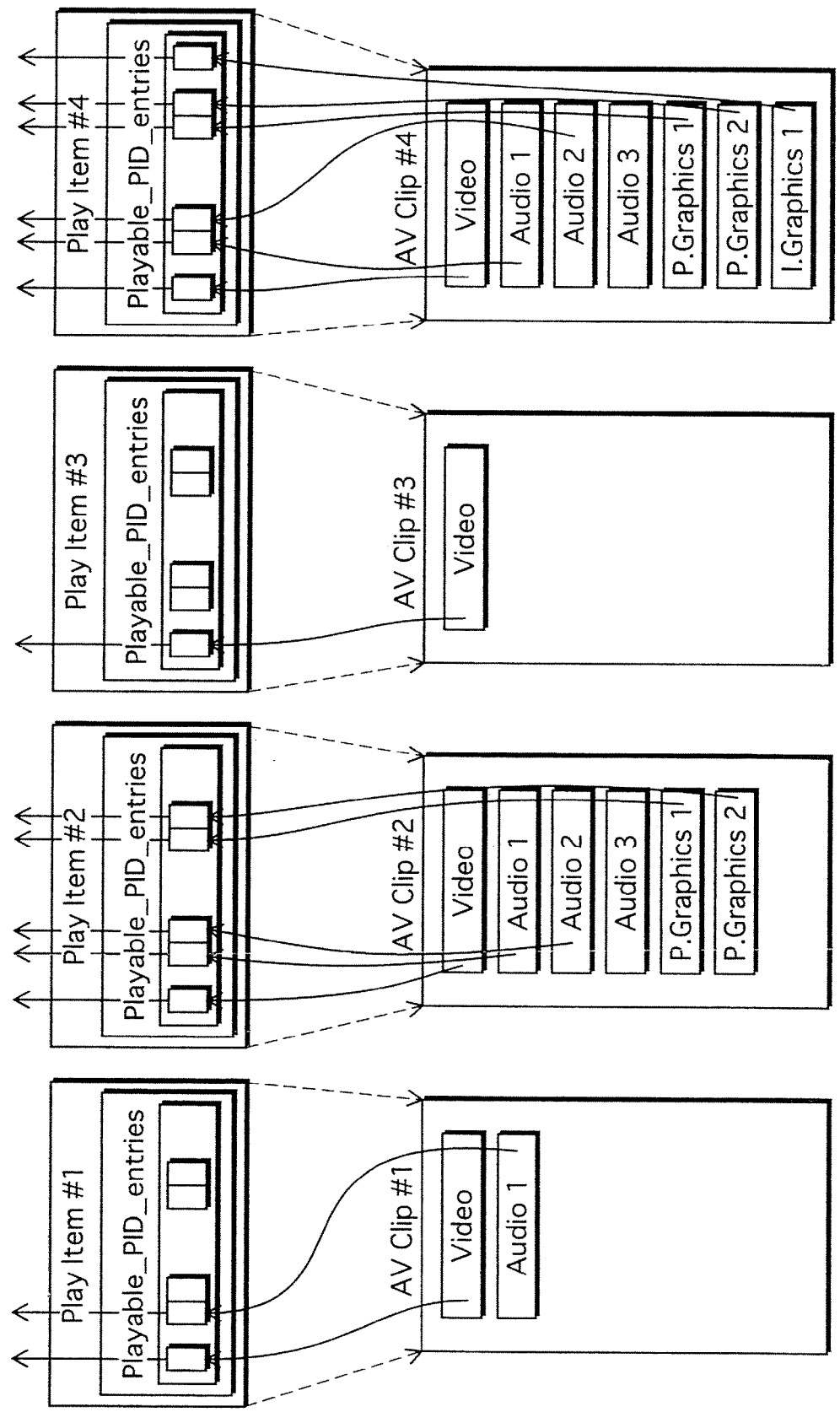
FIG. 19 shows elementary stream selection by a MOVIE object in movie mode.

FIG. 19 shows elementary stream selection by a MOVIE object in movie mode. The upward arrows in FIG. 19 show how the elementary streams are read according to the Playable_PID_entries of each PlayItem. As shown in FIG. 19, the elementary streams that are read in movie mode are the video stream (Video), the audio streams (Audio 1, Audio 2), the presentation graphics streams (P.Graphics 1, P.Graphics 2, P.Graphics 3) and the interactive graphics streams (I.Graphics1, I.Graphics 2, I.Graphics 3) multiplexed on each AVClip.

Figure 20:
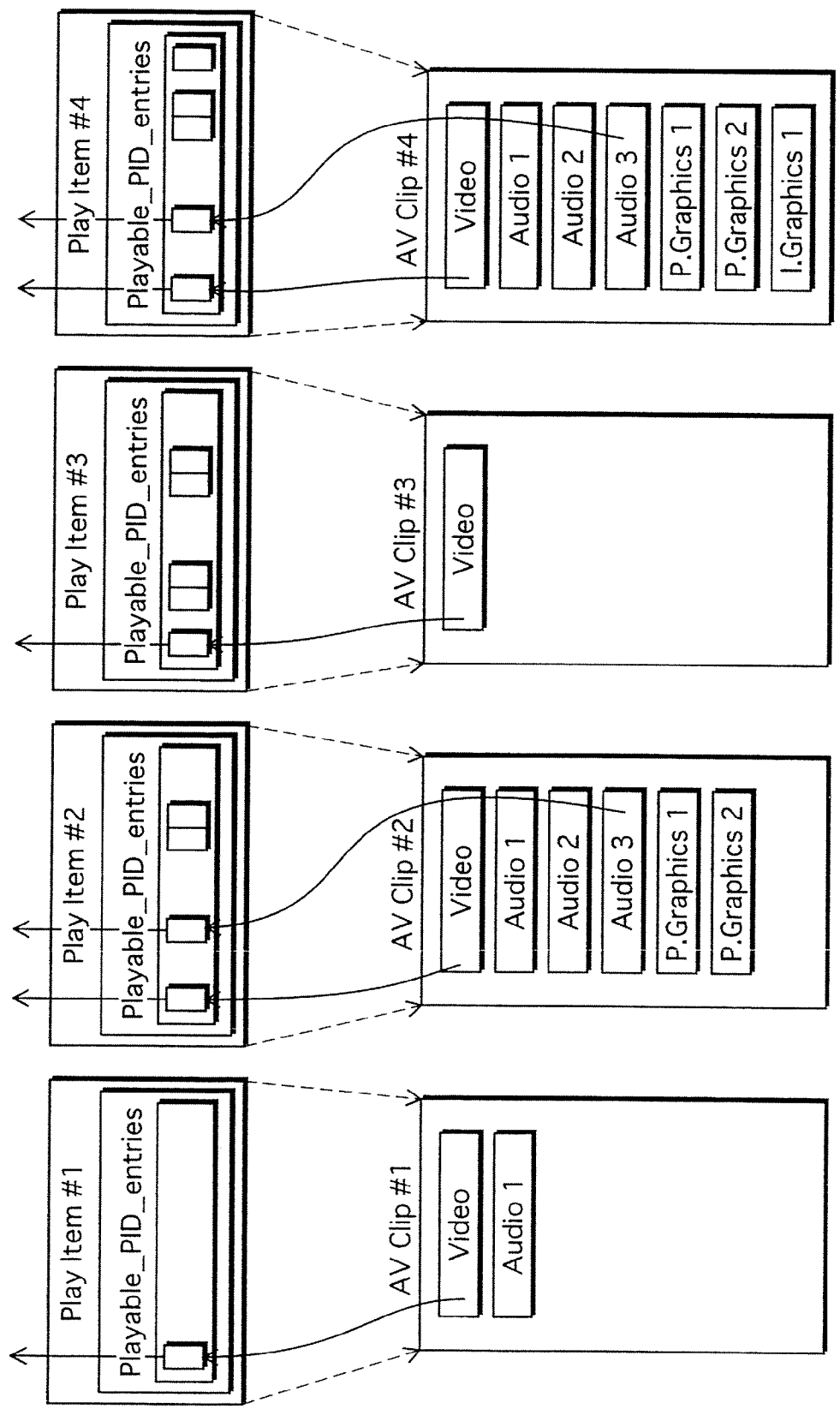
FIG. 20 shows elementary stream selection by a Java object in enhanced mode.

FIG. 20 shows elementary stream selection by a Java object in enhanced mode. The upward arrows in FIG. 20 show how the elementary streams are read according to the Playable_PID_entries of each PlayItem. As shown in FIG. 20, the elementary streams that are read in enhanced mode are the video stream (Video) and an audio stream (Audio 3). Even when AVClips that have audio for various languages, AVClips that have subtitles for various languages, and AVClips that have buttons scattered at various places throughout the movie work, elementary streams can be selected consistently throughout the PL on basis of the Playable_PID_entries settings. Even if a particular AVClip is surrounded by AVClips having no audio at all, or having only one audio elementary stream, only the necessary elementary streams for the mode will be read from the particular AVClip. Furthermore, consistent playback of elementary streams can be achieved even if the elementary streams and the PIDs have different correspondence in different AVClips.

Since PlayItems have non-exclusivity, it is possible to set two or more PlayItems having different filter specifications with respect to a same AVClip. PlayItems can be created according to purpose such that, for example, playback of the graphics stream is possible in a particular PlayItem but prohibited in another PlayItem. If the filter specification function was to be provided in Clip information, the Clip information would have exclusivity, but, since only one Clip information is able to be set for each one AVClip, the Clip information would not have nonexclusivity. Accordingly, if the filter specification information is provided in the Clip information, it is not possible to set a plurality of pieces of information having different filter specification contents with respect to one AVClip. Since this would make it difficult to create PlayItems for different purposes, providing the filter designation information in the Clip information is not wise. On the other hand, if the information indicating filter specification was to be provided in dynamic scenarios, the dynamic scenarios would have nonexclusivity but not exclusivity. This makes selection of elementary streams difficult if there are disparities in the number of multiplexed elementary streams. Taking all this into account, it makes sense to provide the information indicating filter specification in PlayItems, which have both exclusivity and nonexclusivity. Note that this description does not exclude the filter specification information from being provided in Clip information or dynamic scenarios. The filter specification information may, of course, be provided in Clip information or dynamic scenarios.

Furthermore, Playable_PID_entries is significant in preventing interference from button commands embedded in interactive graphics streams. A button command is a command executed when an confirmation operation is performed with respect to a button written in an interactive graphics stream. The incorporation of button commands in AVClips is convenient in the description of playback controls for having a playback apparatus execute specific processing according to a timing at which a particular frame of video appears on the screen. In other words, convenient for precisely synchronizing playback controls with video contents. In addition, since the button commands are multiplexed on the actual AVClips, even when there are several hundred sections to perform playback control for, there is no need to store all button commands corresponding to the sections in the memory. The button commands are read from the BD-ROM for every ACCESS UNIT along with the video packets. Therefore, the button commands corresponding to the video section currently being played can be kept in the memory and deleted when playback of the video section has finished, and the button commands corresponding to the next video section can then be stored in the memory. Since button commands are multiplexed on the AVClip, the amount of memory provided in the playback apparatus can be kept to a minimum even if there are several hundred button commands.

If button commands are embedded in the streams, interference with dynamic scenarios in Java mode becomes a problem. For example, when playback control is performed in Java mode, if a button command embedded in a stream is supplied to the control unit of the playback apparatus, the Java mode dynamic scenario and the button command will be executed simultaneously, thereby causing the player to operate erroneously. As such, Playable_PID_entries in PlayItems used in Java mode are set so that multiplexed interactive graphics streams are not extracted. This prevents the button commands in the interactive graphics streams from interfering with instructions in the Java program.

The described data structure is an instance of the class structure written in a programming language. The authoring party is able to obtain this data structure on a BD-ROM by writing this class structure.

Figure 21:
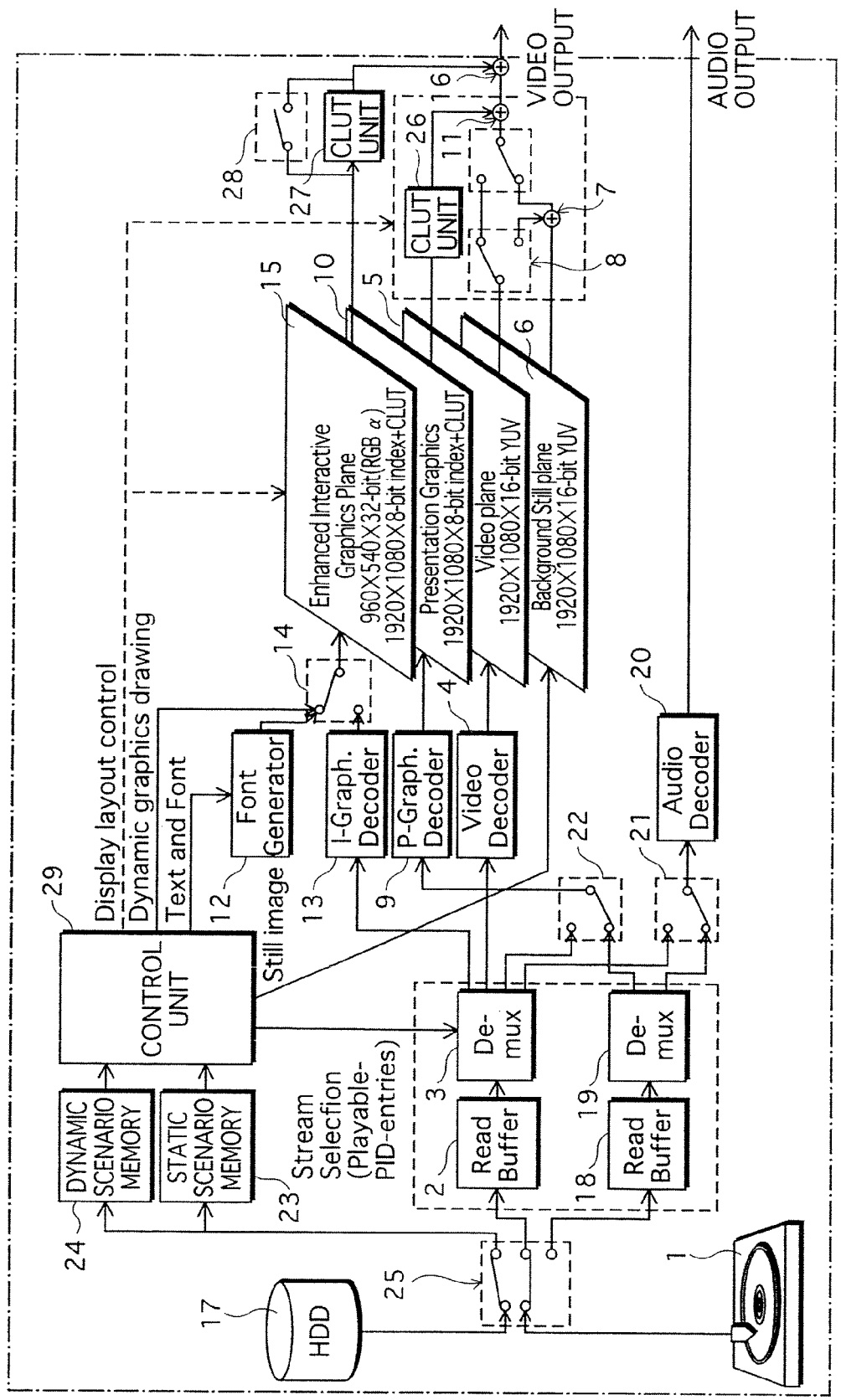
FIG. 21 shows an internal structure of a playback apparatus of the present invention.

This completes the description of the recording medium of pertaining to an embodiment of the present invention. FIG. 21 shows the internal structure of a playback apparatus pertaining to the present invention. A playback apparatus pertaining to the present invention comprises two main parts, namely, a system LSI and a drive device, and can be produced industrially by mounting these parts to the cabinet and substrate of a device. The system LSI is an integrated circuit that integrates a variety of processing units for carrying out the functions of the playback apparatus. A playback apparatus thus produced is structured from a BD drive 1, a read buffer 2, a demultiplexer 3, a video decoder 4, a Video plane 5, a Background Still plane 6, a composition unit 7, a switch 8, a P-graphics decoder 9, a Presentation Graphics plane 10, a composition unit 11, a font generator 12, an I-graphics decoder 13, a switch 14, an Enhanced Interactive Graphics plane 15, a composition unit 16, an HDD 17, a read buffer 18, a demultiplexer 19, an audio decoder 20, a switch 21, a switch 22, a static scenario memory 23, a dynamic scenario memory 24, a CLUT unit 26, a CLUT unit 27, a switch 28, and a control unit 29.

The BD-ROM drive 1 performs loading/ejecting of BD-ROMS, and accesses loaded BD-ROMS.

The read buffer 2 is a FIFO memory that stores ACCESS UNITs read from BD-ROMs on a first-in first-out basis.

The demultiplexer (De-MUX) 3 extracts ACCESS UNITs from the read buffer 2 and converts the TS packets that compose the ACCESS UNIT into PES packets. The demultiplexer 3 then outputs any of the obtained PES packets that have a PID indicated by the Playable_PID_entries to the video decoder 4, the audio decoder 20, the P-Graphics decoder 9 or the I-Graphics decoder 13.

The video decoder 4 decodes the PES packets output by the demultiplexer 3, thereby obtaining pictures in an uncompressed format, and writes the pictures to the Video plane 5.

The Video plane 5 is for storing uncompressed pictures. A plane is a memory area for storing pixel data of one screen in the playback apparatus. By providing a plurality of planes in the playback apparatus, and adding together the storage contents of the planes for each pixel and outputting the resulting video, video that is a combination of a plurality of video contents can be output. The resolution of the Video plane 5 is 1920*1080, and picture data stored in this Video plane 5 is composed of pixel data expressed as 16-bit YUV values.

The Background Still plane 6 is for storing still images to be used as backgrounds in enhanced mode. The resolution of the Background Still plane 6 is 1920*1080, and picture data stored in this Background Still plane 6 is composed of pixel data expressed as 16-bit YUV values.

The composition unit 7 composites an uncompressed picture stored in the Video plane 5 with a still image stored in the Background Still plane 6.

The switch 8 switches such that the uncompressed picture in the Video plane 5 is either output as is, or output having been composited with the storage contents of the Background Still plane 6.

The P-Graphics decoder 9 decodes graphics streams read from the BD-ROM and the HD, and writes raster graphics to the Presentation Graphics plane 10. Subtitles appear on the screen as a result of decoding the graphics stream.

The Presentation Graphics plane 10 is a memory that has an area corresponding to one screen, and stores one screen of raster graphics. The resolution of the Presentation Graphics plane 10 is 1920*1080, and each pixel of the raster graphics in the Presentation Graphics plane 10 is expressed as an 8-bit index color. The index colors of the raster graphics stored in the Presentation Graphics plane 10 are converted with use of a CLUT (Color Lookup Table) for use in display. Java objects are unable to access the Presentation Graphics plane 10 directly. The reason for such a prohibition is the following request. When a DVD compatible program and Java objects share one Graphics plane, the most newly written contents will be displayed with priority. This means that the most newly written contents will be displayed so as to obscure contents written earlier. However, since the DVD compatible program and the Java objects do not operate in synchronization, they are unable to know which contents written to the Graphics plane are to be given priority. This potentially leads to a situation in which, although the contents written by the DVD compatible program should be given priority, the Java object performs writing, and freely rewrites the contents written by the DVD compatible program. Because it is difficult to guarantee the operations of the DVD compatible program if such rewriting takes place, direct access to the Presentation Graphics plane 10 by Java objects is prohibited.

The composition unit 11 composites the storage contents of the Presentation Graphics plane 10 with either (i) uncompressed picture data or (ii) picture data that has been composited with the storage contents of the Background Still plane 6.

The font generator 12 converts text code output by the control unit 29 into character fonts. The type of font to which the text code is converted is instructed based on a specification by the control unit 29.

The I-Graphics decoder 13 decodes interactive graphics streams read from the BD-ROM or the HD, and writes resulting raster graphics to the Enhanced Interactive Graphics plane 15. Buttons that compose a dialog screen appear on the screen as a result of decoding the interactive graphics stream.

The switch 14 is for selectively inputting font strings generated by the font generator 12, rendition contents rendered directly by Java objects, and buttons generated by the I-Graphics decoder 13 to the Enhanced Interactive Graphics plane 15.

Figure 22A:
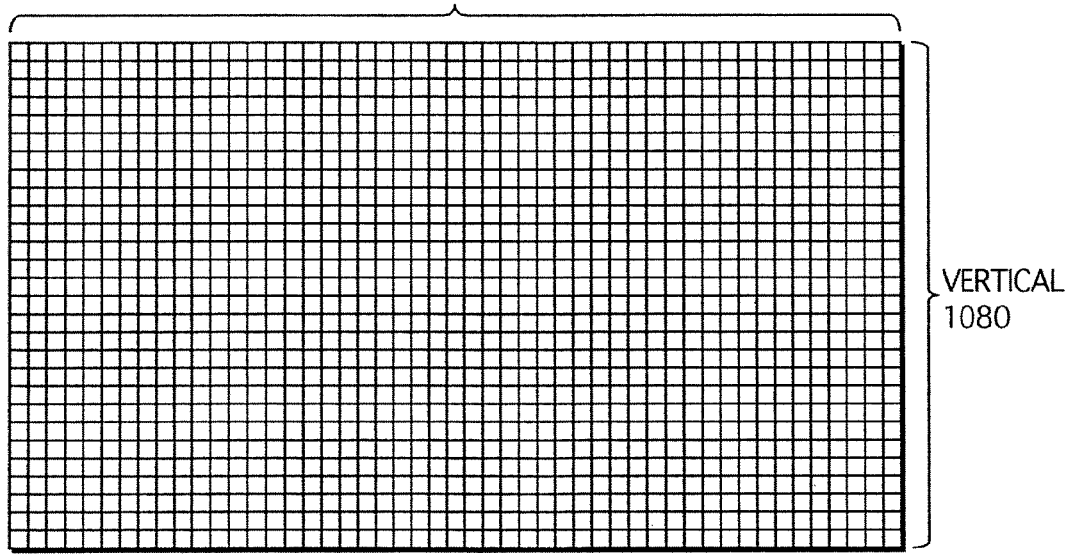
FIG. 22A shows memory allocation of an Enhanced Interactive Graphics plane 15 in movie mode.
Figure 22B:
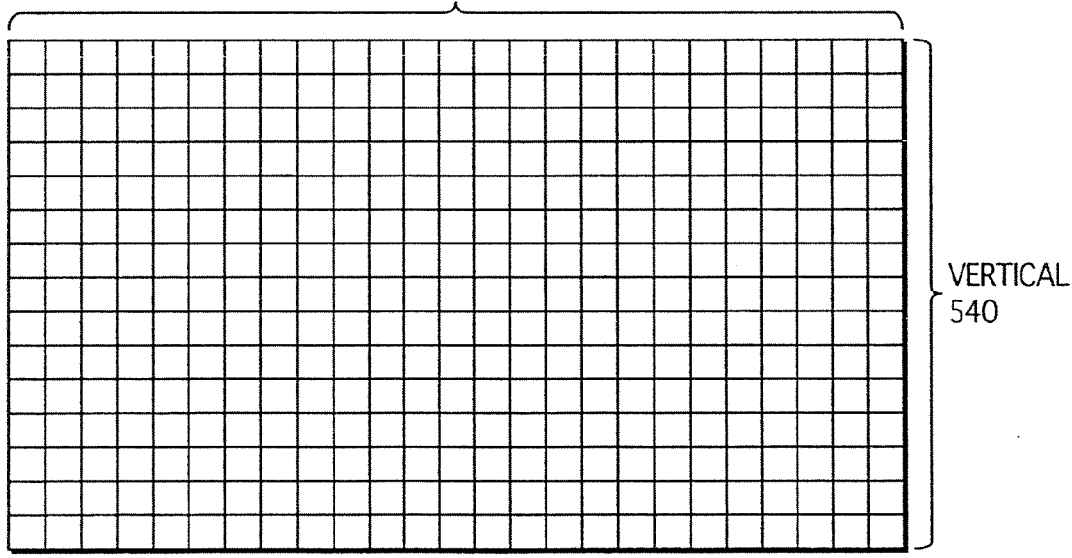
FIG. 22B shows memory allocation of the Enhanced Interactive Graphics plane 15 in enhanced mode.

The Enhanced Interactive Graphics plane 15 is a Graphics plane whose memory allocation differs depending on whether the mode is movie mode or enhanced mode. FIG. 22A shows the memory allocation of the Enhanced Interactive Graphics plane 15 in movie mode, and FIG. 22B shows the memory allocation of the Enhanced Interactive Graphics plane 15 in enhanced mode. The memory allocation in movie mode is 1920 (horizontal)*1080 (vertical) 8-bit areas as shown in FIG. 22A. This is a memory area allocation that can store an 8-bit index value per pixel at a resolution of 1920*1080. On the other hand, the memory allocation in enhanced mode is 960 (horizontal)*540 (vertical) 32-bit areas as shown in FIG. 22B. This is a memory area allocation that can store a 32-bit RGB value per pixel at a resolution of 960*540. Compared to movie mode in which the allocated bit length of each pixel is 8 bits and only 256 colors selected from among 16,777,216 colors can be expressed, reproduction of colors close to natural colors is possible with the Enhanced Interactive Graphics plane. This is done with the intention of realizing spectacular, motion-filled screen rendition by thinning out each 2*2 pixels into one pixel, and increasing the number of colors per pixel. The operation mode of the playback apparatus is the basis for determining which memory allocation the Enhanced Interactive Graphics plane 15 takes. If the operation mode is movie mode, the Enhanced Interactive Graphics plane 15 has the 1920 (horizontal)*1080 (vertical)*8-bit area memory allocation, and if the operation mode is enhanced mode, the Enhanced Interactive Graphics plane 15 has the 960 (horizontal)*540 (vertical)*32-bit area memory allocation.

The composition unit 16 composites the storage contents of the Enhanced Interactive Graphics plane 15 with (i) uncompressed picture data, (ii) picture data that has been composited with the storage contents of the Background Still plane 6, and (iii) picture data that has been composited with the storage contents of the Presentation Graphics plane 10 and the Background Still plane 6.

The HDD 17 is a recording medium that stores updated versions of AVClips, Clip information, PL information, and dynamic scenarios recorded on the BD-ROM. By reading the recording contents of the HDD and dynamically compositing the read recording contents with the recording contents of the BD-ROM, playback of audio streams and graphics streams that do not exist on the BD-ROM, and playback of static scenarios and dynamic scenarios that do not exist on the BD-ROM, can be realized.

The read buffer 18 is a FIFO memory that stores ACCESS UNITs read from the HDD 17 on a first-in first-out basis.

The demultiplexer (De-MUX) 19 extracts ACCESS UNITs from the read buffer 18 and converts the TS packets that compose the ACCESS UNITs into PES packets. The demultiplexer 19 then outputs any of the obtained PES packets that have a PID indicated by the Playable_PID_entries to the audio decoder 20 or the P-Graphics decoder 9.

The audio decoder 20 decodes the PES packets output by the demultiplexer 19, thereby obtaining uncompressed audio data.

The switch 21 is for switching the input source of the audio decoder 20, which in the present case is switched between the BD-ROM and the HDD.

The switch 22 is for switching the input source of the P-Graphics decoder 9, and, in the present case, enables presentation graphics streams from the HD and presentation graphics streams from the BD-ROM to be selectively input to the P-Graphics decoder 9.

The static scenario memory 23 is a memory for storing current PL information, current Clip information, and the like. Current PL information is the piece currently targeted for processing among the plurality of PL information recorded on the BD-ROM. Current clip information is the piece currently targeted for processing among the plurality of Clip information recorded on the BD-ROM.

The dynamic scenario memory 24 is for storing the current dynamic scenario, and is used for processing according to DVD-like module 33, a Java module 34, and a Browser module 35. Current dynamic scenario is the scenario currently targeted for processing among the plurality of scenarios recorded on the BD-ROM.

The switch 25 allows selective input of various data read from the BD-ROM and the HD to the read buffer 2, the read buffer 18, the static scenario memory 23, and the dynamic scenario memory 24.

The CLUT unit 26 converts index colors of the raster graphics stored in the Video plane 5, based on Y, Cr, and Cb values indicated in PDS.

The CLUT unit 27 converts index colors of the raster graphics stored in the Enhanced Interactive Graphics plane 15, based on Y, Cr, and Cb values indicated in PDS.

The switch 28 is a switch for switching such that the conversion by the CLUT unit 27 is through output in enhanced mode.

The control unit 29 instructs the video decoder 4 which of elementary streams multiplexed on an AVClip are to be played, by outputting the Playable_PID_entries included in the PlayItem to the video decoder 4 (Stream Selection). The control unit 29 specifies the elementary streams to be played via the PlayItem is because Java objects are prohibited from directly accessing the Presentation Graphics plane 10. If the elementary streams indicated by the Playable_PID_entries are read from the AVClip in this way, the font generator 12 is made to generate a font string by the Enhanced Interactive Graphics plane 15 being directly accessed (Dynamic graphics drawing) or by being given the text and font type (Text and Font), and the generated font string is arranged on the Enhanced Interactive Graphics plane 15. If rendering on the Enhanced Interactive Graphics plane 15 is performed in this way, the composition unit 16 composites the storage contents of the Enhanced Interactive Graphics plane with the storage contents of the Video plane 5 after enlargement or reduction of the storage contents of the Video plane 5 has been instructed (Display layout control).

Figure 23:
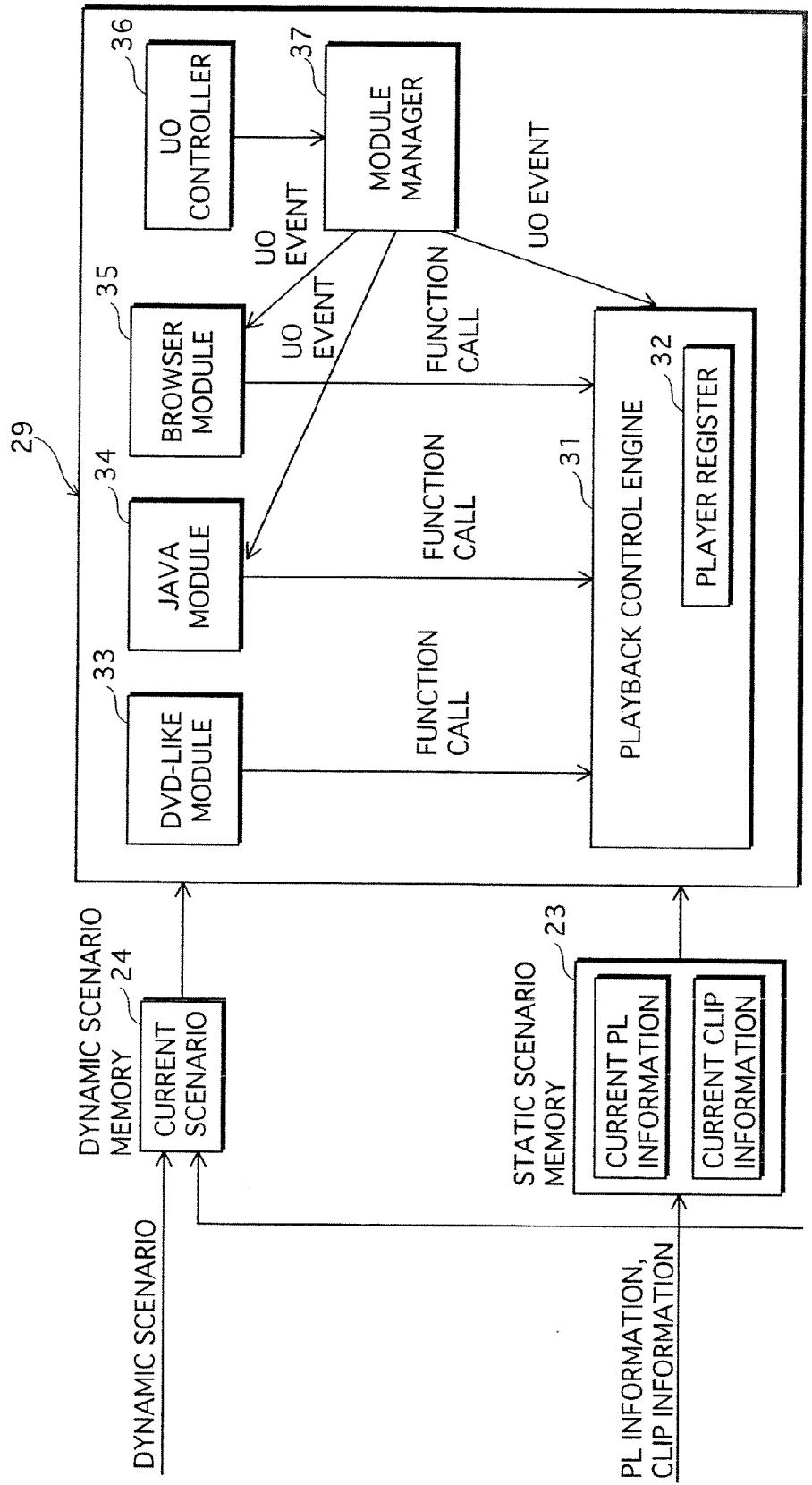
FIG. 23 shows an internal structure of a control unit 29.

Thus completes the internal structure of the playback apparatus. FIG. 23 shows in internal structure of the control unit 29. As shown in FIG. 23, the control unit 29 is composed of a playback control engine 31, a player register 32, the DVD-like module 33, the Java module 34, the BROWSER module 35, a UO controller 36, and a module manager 37.

The playback control engine 31 is a DVD compatible program that executes various functions such as (1) AV playback functions, (2) PlayList playback functions, and (3) status-acquisition/setting functions in the playback apparatus. The AV playback functions in the playback apparatus, which consist of a function group similar to that found in DVD players and CD players, refer to the execution in response to user operations of processing, such as starting playback (Play), stopping playback (Stop), pausing (Pause On), releasing pause (Pause Off), releasing a still (Still off), speed specified fast forwarding (Forward Play (speed)), speed specified fast-rewinding (Backward Play (speed)), changing audio settings (Audio Change), changing subtitle settings (Subtitle Change), and changing angle settings (Angle Change). The PL playback functions refer to the execution of Play, Stop, and other of the AV playback functions in accordance with PL information. The playback control engine 31 functions as Layer 3 (playback controls based on static scenarios) in the layer model by executing these PL playback functions. The playback control engine 31 executes the AV playback functions in accordance with operations from the user. On the other hand, the playback control engine 31 executes functions (2) and (3) in accordance with function calls from the DVD-like module 33, the Java module 34, and the BROWSER 35. That is, the playback control engine 31 executes its own functions in response to instruction resulting from user operations and instructions from higher-level layers in the layer model.

The player register 32 is composed of 32 System Parameter Registers and 32 General Purpose Registers. The stored values of these registers are used in programming as variables SPRMs and GPRMs. System parameter registers and the general purpose registers are managed by the playback control engine 31 which is separate from the DVD-like module 33, the Java module 34, and the BROWSER module 35. Therefore, it is possible, even when switching in playback modes occurs, for the module that implements the playback mode after the mode-switch to find the playback status of the playback apparatus simply by referring to SPRMs (0) to (31) and GPRMs (0) to (31).

The DVD-like module 33, which is a DVD virtual player that is the main execution body of the movie MODE, executes current MOVIE objects read to the dynamic memory 24.

The Java module 34, which is a Java platform, creates current Java objects from ZZZ.CLASS read to the dynamic scenario memory 24, and executes the current Java objects. The Java module 34 converts Java objects written in Java language into native codes for the CPU in the playback apparatus, and has the CPU execute the native codes.

The BROWSER module 35 is a browser that is the main execution body of the Browser mode, and executes current WebPage objects read to the dynamic scenario memory 24.

The UO controller 36 detects user operations performed with respect to the remote controller or the front panel of the playback apparatus, and outputs information showing the detected user operations (hereinafter called a "UO") to the module manage 37.

The module manager 37 performs mode management and branch control. The mode management by the module manager 37 refers to the allocation of modules; namely which of the DVD-like module 33, the Java module 34, and the BROWSER 35 is execute dynamic scenarios. The principle of module allocation is that the DVD-like module 33 executes dynamic scenarios. This principle is upheld even in the case of branches resulting from intra-modes (i.e. branches within the same mode). An exception is when an inter-mode branching occurs (i.e. branching between different modes). When branching from a MOVIE object to a Java object or a WebPage object occurs, the Java module 34 or the BROWSER object 35, respectively, executes the current object. Furthermore, when the UO controller 36 receives a UO (a user event), the module manager 37 generates an event indicating that UO, and outputs the user event to the playback control engine 31, the Java module 34, and the BROWSER module 35.

Figure 24:
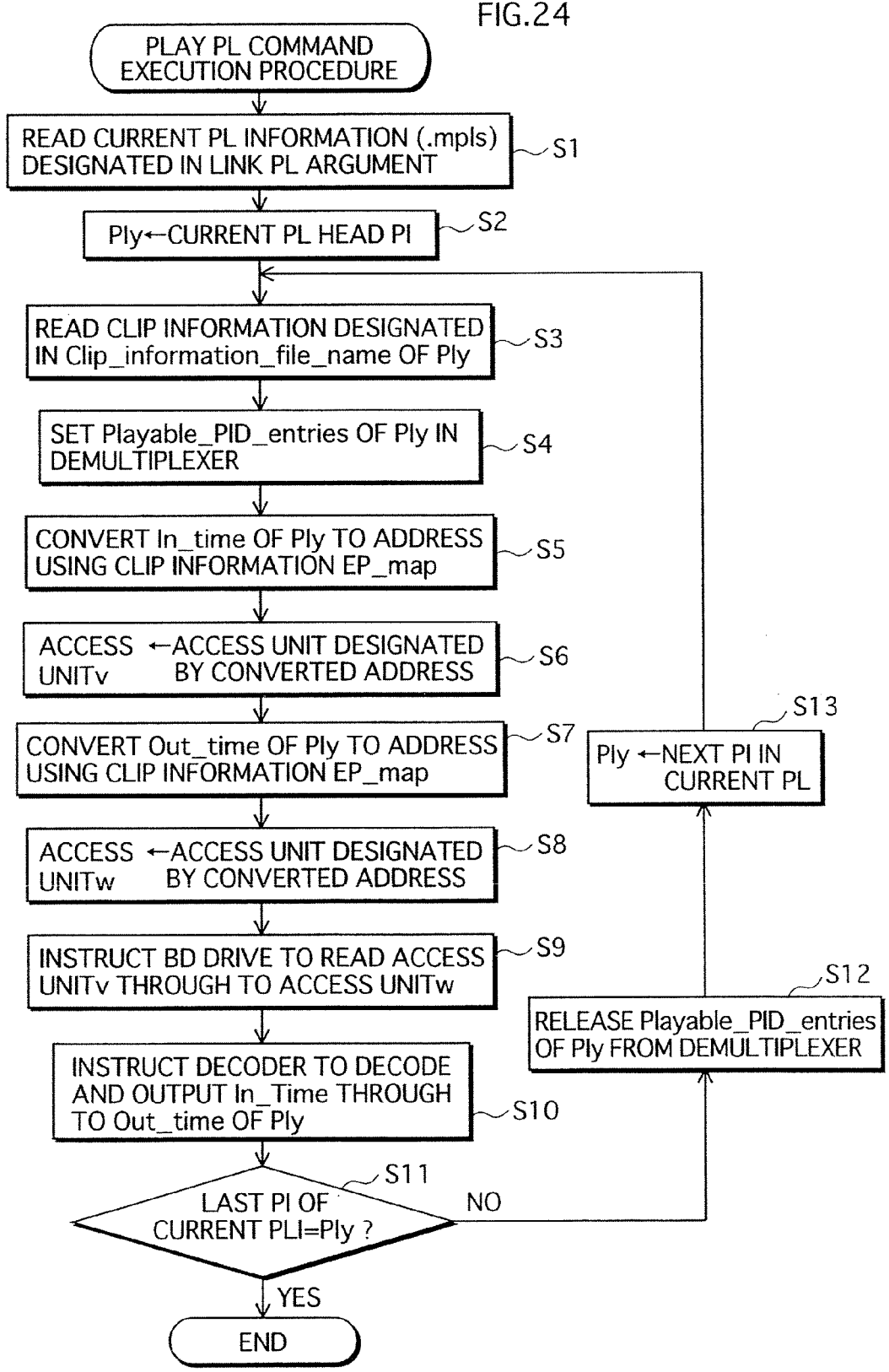
FIG. 24 is a flowchart showing the execution procedure of PLPlay commands by the playback control engine 31.

The processing in the playback apparatus of the present embodiment is realized by the playback control engine 31 executing the processing procedure of FIG. 24.

FIG. 24 is a flowchart showing the execution procedure of a PLPlay command by the playback control engine 31. In the flowchart, PIy denotes a PlayItem that is a processing target, and ACCESS UNITv denotes an ACCESS UNIT that is a processing target. The playback control engine 31 reads current PL information (.mpls) designated in the argument of LinkPL (step S1), and sets the head PI information of the current PL information as PIy (step S2). The playback control engine 31 then reads the Clip information designated by the Clip_Information_file_name of PIy (step S3).

After reading the Clip information, the playback control engine 31 sets the Playable_PID_entries of PIy in the demultiplexer 3. This makes the Playable_PID_entries of PIy valid while playback is being performed with PIy.

When the Playable_PID_entries is made valid in this way, the playback control engine 31 converts the In_time of the PIy to an address with use of the EP_map of the current Clip information (step S5), and sets the ACCESS UNIT designated by the converted address as ACCESS UNITv (step S6). Meanwhile, the playback control engine 31 converts the Out_time of the PIy to an address with use of the EP_map of the current Clip information (step S7), and sets the ACCESS UNIT designated by the converted address as ACCESS UNITw (step S8).

Once ACCESS UNITv and ACCESS UNITw have been determined in this way, the playback control engine 31 instructs the BD drive 1 to read ACCESS UNITs from ACCESS UNITv through to ACCESS UNITw (step S9), and instructs the video decoder 4 and the audio decoder 20 to decode and output the read ACCESS UNITs from the In_time to the Out_time of PIy (step S10).

Step S11 is for determining whether the processing of the flowchart ends, and here the playback control engine 31 judges of whether PIy has become PIz. In the case of YES at step S11, the processing of the flowchart ends. In the case of NO at step S11, the playback control engine 31 releases the Playable_PID_entries from the demultiplexer 3 (step S12), sets the next PlayItem as PIy (step S13), and returns to step S3. The playback control engine 31 subsequently repeats the processing at step S1 to step S10 until the result of the determination at step S11 is YES. Thus completes the processing procedure of the playback control engine 31.

As has been described, according to the present embodiment, PlayItems are given a filter designation that shows which elementary streams multiplexed on an AVClip are playable and which are unplayable. Therefore, by dynamic scenarios in each mode selecting suitable PlayItems for the particular mode, effect from buttons, subtitles, and button commands in the elementary streams multiplexed on the AVClip can be avoided.

Second Embodiment

Figure 25:
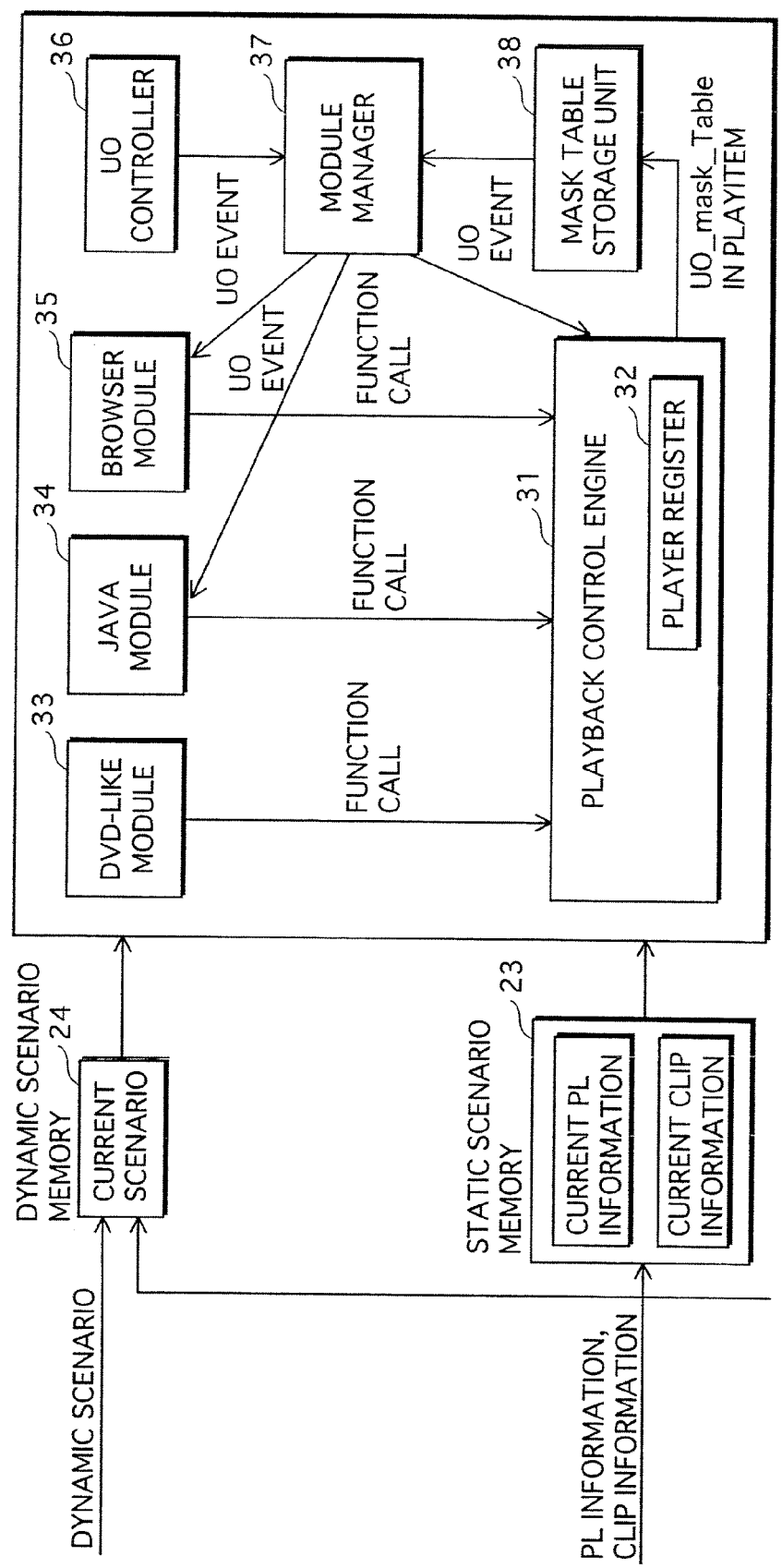
FIG. 25 shows an internal structure of a control unit 29 pertaining to a second embodiment.

The second embodiment relates to an embodiment that avoids conflict between the playback control engine 31 and the Java module 34 when a UO occurs. When processing, the Java module 34 triggers a user event that shows the operation performed by the user. This is the same for the playback control engine 31, which, when performing dialog control during playback of an interactive graphics stream, triggers a user event and performs processing accordingly. This causes a problem that in the playback apparatus both the playback control engine 31 and the Java module 34 operate in response to one user event. One way to prevent this is to set the playback apparatus such that the playback control engine 31 does not operate in enhanced mode. However, since the playback control engine 31 provides functions in response to function call by the Java module 34, it is not appropriate to stop operations of the playback control engine 31. In view of these problems, in the second embodiment, processing is performed such that the playback control engine 31 does not output with respect to certain types of UO. FIG. 25 shows the internal structure of a control unit 29 pertaining to the second embodiment. Features that are new in FIG. 25 are the provision of a mask table storage unit 38, and that the module manager 37 issues a user event following the settings of the mask table storage unit 38.

The mask table storage unit 38 stores a mask table. The mask table shows whether each of a plurality of user events that potentially occur should be masked or not. Types of user events that may be shown are pressing of a MoveUp key, a MoveDown key, a MoveRight key, a MoveLeft key, an activate key, any of numeric value keys, or special playback (fast forward, rewind, time search, chapter search) of the remote control. Masking these user events denotes that, even if any one of these keys is pressed, a user event showing the pressing is not output to the playback control engine 31.

The mask table is set in either of two ways with respect to the mask table storage unit 38: (1) so that the UO_mask_Table shown in the PlayItem is read, and the mask table storage unit 38 stores the read mask table; and (2) so that the UO_mask_Table shown in the PlayItem is read, and the mask table storage unit 38 stores a converted mask table. This conversion is performed by obtaining the logical sum of the UO_mask_Table shown in the PlayItem and a predetermined bit pattern, and writing the obtained logical sum to the mask table storage unit 38.

Figure 26:
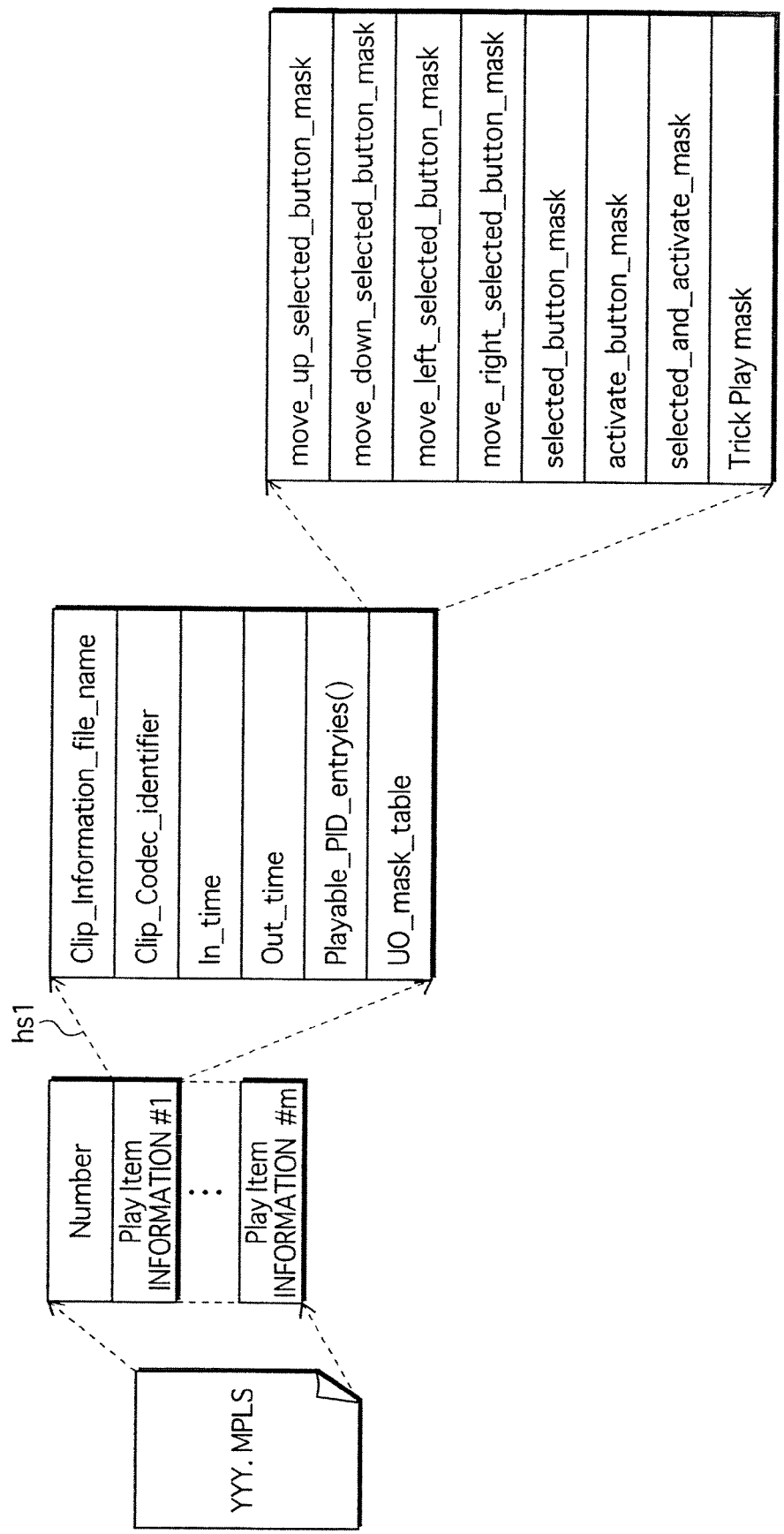
FIG. 26 shows a PlayItem in which a UO_mask_Table is provided.

FIG. 26 shows a PlayItem in which a UO_mask_Table is included. In FIG. 26, the UO_mask_Table includes a move_up_selected_button_mask flag, a move_down_selected_button_mask flag, a move_left_selected_button_mask flag, a move_right_selected_button_mask flag, a select_button_mask flag, an activate_button_mask flag, a select_and_activate_button_mask flag, and a TrickPlay_mask flag.

The move_up_selected_button_mask flag shows whether or not to mask a user event showing pressing of the MoveUp key.

The move_down_selected_button_mask flag shows whether or not to mask a user event showing pressing of the MoveDown key.

The move_left_selected_button_mask flag shows whether or not to mask a user event showing pressing of the MoveLeft key.

The move_right_selected_button_mask flag shows whether or not to mask a user event showing pressing of the MoveRight key.

The select_button_mask flag shows whether or not to mask a user event showing pressing of a numerical value key.

The activate_button_mask flag shows whether or not to mask a user event showing pressing of the activate key.

The select_and_activate_button_mask flag shows whether or not to mask a user event showing pressing of the numerical value keys.

The TrickPlay_mask flag shows whether or not to mask a user event showing a fast forward, rewind, time search, or chapter search operation.

Since the UO_mask_Table is provided in each PlayItem, when starting playback according to a PlayItem, the playback control engine 31 sets the UO_mask_Table included in the PlayItem to the mask table storage unit 38 as the mask table, and then deletes the mask table from the mask table storage unit 38 when playback according to the PlayItem has finished.

On the other hand, if UO_mask_Tables in PlayItems that are referred to in enhanced mode are set so that user operations are masked, and UO_mask_Tables in PlayItems that are referred to in movie mode are set so that user operations are not masked, by having the playback apparatus perform the described setting and deleting, conflict between the playback control engine 31 and the Java module 34 in logical playback sections (PlayItems) can be avoided.

Furthermore, the UO_mask_Tables in PlayItems that are referred to in movie mode may be set such that user operations are masked in some PlayItems and not masked in other PlayItems. This enables user operations to be set in different ways, such that user operations are received in one version of a Title and not received in another version of the Title. A merit of such differentiation is that demonstration versions can be created more easily.

Third Embodiment

Figure 27:
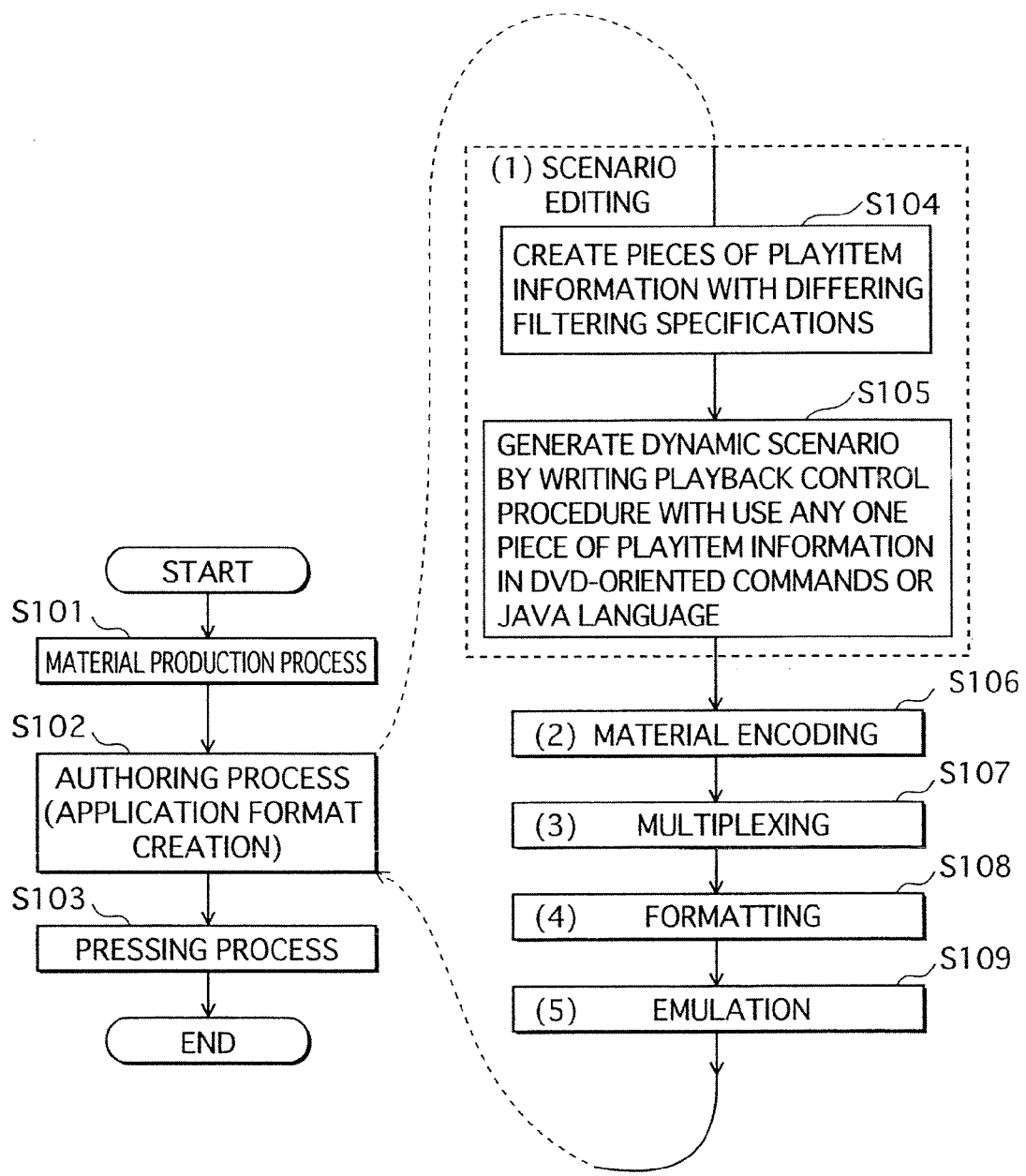
FIG. 27 is a flowchart showing production processing for a BD-ROM.

The present embodiment relates to BD-ROM production processes. FIG. 27 is a flowchart showing BD-ROM production processes.

The BD-ROM production processes include a material production process S101 for creating materials such as moving image records and audio records, an authoring process S102 for generating an application format with use of an authoring device, and a pressing process S103 for creating the BD-ROM master, and pressing/laminating to complete the BD-ROM.

Of these processes, the authoring process targeting the BD-ROM comprises the processes of steps S104 to S109.

The scenario editing process S104 is for converting an outline created in the planning stage into a format comprehensible to a playback apparatus. The scenario editing result is created as BD-ROM scenarios. Also, multiplexing parameters are also created in the scenario editing so as to realize multiplexing. In the scenario editing processing in the present embodiment, a plurality of pieces of PlayItem information having respectively different filtering specifications are generated (step S104), and dynamic scenarios are generated by writing playback control that uses any of the pieces of PlayItem information in DVD-oriented commands or Java language (step S105). Static scenarios and dynamic scenarios are completed in this process.

The material encoding process S106 is a task for respectively encoding video, audio and sub-video material to obtain video, audio and graphics streams.

In the multiplexing process S107, video, audio, and graphics streams obtained as a result of the material encoding are interleave-multiplexed, and the result is converted to a single digital stream.

In the formatting process S108, various types of information are created based on BD-ROM-oriented scenarios, and the scenarios and digital streams are adapted to a BD-ROM format.

The emulation process S109 is for confirming whether the authoring result is correct.

Because of being able to describe Java object and WebPage objects using Java and markup languages, it is possible in the authoring process described above to develop Java object and WebPage objects using the same sensibility as that applied in the development of normal computer-oriented software. Therefore, the present embodiment has the effect of increasing the efficiency of scenario creation.

Remarks

The above description by no means shows the implementation of all configurations of the present invention. Implementation of the present invention is still possible according to implementation of configurations that carry out the following modifications (A), (B), (C), (D), . . . . The inventions pertaining to the claims of the present application range from expanded disclosure to generalized disclosure of the plurality of embodiments disclosed above and the modified configurations thereof. The degree of expansion or generalization is based on the particular characteristics of technical standards in the technical field of the present invention at the time of the application. However, since the inventions pertaining to the claims reflect the means for resolving technical issues relating to the prior art, the technical range of the inventions pertaining to the claims does not extend beyond the technical range recognized by those knowledgeable in the art with respect to resolving technical issues relating to the prior art. As such, the inventions pertaining to the claims of the present application possess a material correspondence with the disclosures in the detailed description.

(A) In all of the embodiments, an optical disk pertaining to the present invention is implemented as a BD-ROM. However, the optical disk of the present invention is characterized by the recorded dynamic scenarios and the Index Table, and these characteristics are not dependent on the physical properties of a BD-ROM. Any form of recording media is applicable as long as there exists the capacity to record dynamic scenarios and Index Tables. For example, optical disks such as DVD-ROM, DVD-RAM, DVD–RW, DVD–R, DVD+RW, DVD+R, CD-R, CD-RW, and the like, and optical-magnetic disks such as PD, MO and the like are applicable. Semiconductor cards such as compact flash cards, PCM-CIA cards and the like are also applicable, as are (i) magnetic recording disks such as flexible disks, SuperDisk, Zip, Clik! and the like, and (ii) removable hard disk drives such as ORB, Jaz, SparQ, SyJet, EXFley, microdrive and the like. Furthermore, the recording medium may also be a built-in hard disk.

Dynamic scenarios, Index Tables, and PlayList information may be recording on a different recording medium to AVClips and stream management information. These may then be read in parallel and played as a single video edit.

(B) Although the playback apparatuses in all of the embodiments output AVClips recorded on a BD-ROM to a TV after decoding, the playback apparatus may be structured from only a BD-ROM drive, and the TV may be equipped with all of the other elements. In this case, the playback apparatus and the TV can be incorporated into a home network connected using IEEE1394. Also, although the playback apparatuses in the embodiments are of a type used after connecting to a television, integral display-playback apparatuses are also applicable. Furthermore, the playback apparatus may be only those part of the playback apparatuses of the embodiment that perform essential parts of the processing. Because these playback apparatuses are all inventions disclosed in the specification of the present application, acts involving the manufacture of playback apparatuses based on an internal structure of the playback apparatuses shown in the first to third embodiments are implementations of the inventions disclosed in the specification of the present application. Acts that involve transferring (retail when cost is involved; a gift when no cost is involved), lending, or importing of playback apparatuses shown in the first to third embodiments are also implementations of the present invention. Acts that involve approaching the general user about transfer, rental or the like by means of show-window displays, catalogue solicitation, pamphlet distribution and the like are also implementations of these playback apparatuses.

(C) Because of the information processing by a computer program shown in the flowchart of FIG. 24 being realized specifically using hardware resources, a computer program showing the processing procedures in the flowchart forms an invention in its own right. Although all of the embodiments show embodiments that relate to the implementation of computer programs pertaining to the present invention in an in incorporated form in the playback apparatuses, the computer programs shown in the first to third embodiments may be implemented in their own right, separate from the playback apparatuses. The implementation of the computer programs in their own right includes acts that involve: (1) production of the programs, (2) transference of the programs, either gratuitous or otherwise, (3) lending of the programs, (4) importing of the programs, (5) providing the programs publicly via bi-directional electronic communications circuits, and (6) approaching the general user about transfer, rental and the like by means of show-window displays, catalogue solicitation, pamphlet distribution, and so forth.

(D) Consider that the element of "time" relating to the steps executed in time-series in the flowchart of FIG. 24 is a required item for specifying the invention. If this is the case, then the processing procedures shown by the flowchart can be understood as disclosing the usage configurations of the playback method. Execution of the processing in the flowcharts so as to achieve the original objects of the present invention and to enact the actions and effects by performing the processing of the steps in time-series is, needless to say, an implementation of the recording method pertaining to the present invention.

(E) When recording on a BD-ROM, extension headers preferably are appended to TS packets structuring AVClips. These extension headers, which are called TP_extra_header, include an "Arrival_Time_Stamp" and a "copy_permission_indicator" and have a 4-bit type data length. TP_extra_header-attached TS packets (hereinafter, abbreviated to "EX-attached TS packet") are arranged into groups of 32 packets, and written into three sector. Each group comprising 32 EX-attached TS packets is 6,144 bytes in length (=32*192), and matches the 6,144-byte size of three sectors (=2048*3). The grouping of 32 EX-attached TS packets contained in three sectors is referred to as an "Aligned Unit".

A playback apparatus 200 transmits Aligned Units in transmission processing as described below, when used in a home network connect via IEEE1394. That is, a device on the side of the sender removes the TP_extra_header from each of the 32 EX-attached TS packets included in an Aligned Unit, and outputs the TS packets after encoding the TS packet body based on a DTCP standard. When outputting TS packets, isochronous packets are inserted between all adjacent TS packets. The positioning of isochronous packets is based on times shown in the Arrival_Time_Stamp in each TP_extra_header. The playback apparatus 200 outputs a DTCP_Descriptor following the outputting of the TS packets. The DTCP_Descriptor shows a copy permissibility setting in each TP_extra_header. Here, if the DTCP_Descriptor is described so as to show "copy prohibited", TS packets will not be recorded on other devices when used in a home network connected via IEEE1394.

(F) Although digital streams recorded on a recording medium in the embodiments are AVClips, the digital streams may be VOBs (Video Objects) complying with a DVD-Video standard or a DVD-Video Recording standard. VOBs are program streams compliant with ISO/IEC13818-1 obtained by multiplexing video and audio streams. Also, video streams in AVClips may be MPEG-4 format, WMV format, or the like. Furthermore, audio streams may be a Linear-PCM format, Dolby-AC3 format, MP3 format, or MPEG-AAC format.

(G) In the BD-ROM layer model, Browser mode and MOVIE mode may be disposed over Java mode. Particularly because of the light burden on the playback apparatus of the execution of control procedures based on the dynamic scenarios, the interpretation of dynamic scenarios in MOVIE mode, and the like, no problems arise even when MOVIE mode is executed over Java mode. Also, when developing playback apparatuses and movie works, operation assurance can be dealt with in a single mode.

Furthermore, Java mode processing may be executed only in Java mode, without providing three modes. Since playback control synchronized with PL playback are possible even in Java mode, the necessity of providing MOVIE mode is removed. Furthermore, controls in dynamic scenario may be only MOVIE mode or only Browser mode.

(H) In order to play two or more PlayItems that structure a PL in a row, it is preferable that a process has been conducted so as to join these PlayItems seamlessly.

A process for a seamless join can be realized by copy an end part of a preceding playback section and a head part of a follow-on playback section of the video data to create a copied portion in advance, and re-encoding the copied portion. Note that the copied portion created for a seamless join may be called a "Bridge-Clip".

Here, it is preferable to set the end part and head part as follows.

The end part is preferably composed of an ACCESS UNIT including an Out-point of the preceding playback section and two ACCESS UNITs in from of the Out-point including ACCESS UNIT within a preceding PlayItem information #x. On the other hand, the head part is composed of an ACCESS UNIT including an In-point of the follow-on playback section within the following PlayItem information #x+1. The ground for setting the end and head parts in this way is described in the related technology of U.S. Pat. Publication No. 6,148,140 disclosed by the applicant of the present invention, and therefore for more detail refer to the patent publication.

Furthermore, it is desirable to set seamless join information for the copied portion created for a seamless join. Seamless join information includes a playback starting time of the first video frame, a playback ending time of the last video frame, an audio gap starting time, an audio gap duration, and audio gap location information. When such seamless join information has been defined, it is possible to calculate the difference in the timestamps (STC-Offset) of the two section using the playback starting time of the first video frame and the playback ending time of the last video frame, and set the calculated difference in a playback apparatus. In addition controlling an audio decoder by referring to the audio gap information allows prevention of audio discontinuity at the time of a transition from one section to another.

(I) Although Java objects in the above embodiments are application that render CGs, any application described in the Java language is applicable. For example, Java objects may be client applications used for EC (Electronic Commerce). Because Java objects that provide descriptions of products involving videos of movie works can be realized, it is possible to bring character business pertaining to movie works to a success. In addition, applications of Java objects may be online fighting games.

A library as used by Java objects may be recorded on BD-ROMs. Such a library includes PNG files, MNG files storing animation data, XML files storing information relating to streams, and HTML/SMIL files.

Information that WebPage objects retrieve from websites may be web pages, and image data. In addition, such information may be AV streams, stream management information, and PL information. WebPage objects may conduct processing in cooperation with search engines.

Furthermore, description languages in the enhanced mode may be C++, C#, and the like.

(J) The Java module may be a Java platform installed in a device in order to receive satellite broadcasts. If the Java module is this Java platform, a playback apparatus according to the present invention shares processing as MHP-use STBs.

Furthermore, the Java module may be a Java platform installed in a device in order to perform mobile telephone processing controls. If the Java module is this Java platform, a playback apparatus according to the present invention shares processing as a mobile telephone.

In addition, the BROWSER module may be browser software that is installed in a computer, and example of such software being Microsoft's Internet Explorer.

(K) Although Java objects in the above embodiments are applications that render CGs, any application described in the Java language is applicable. For example, Java objects may be client applications used for EC (Electronic Commerce). Because Java objects that provide descriptions of products involving videos of movie works can be realized, it is possible to bring character business pertaining to movie works to a success. In addition, applications of Java objects may be online fighting games.

A library as used by Java object may be recorded on BD-ROMs. Such a library includes PNG files, MNG files storing animation data, XML files storing information relating to streams, and HTML/SMIL files.

Information that WebPage objects retrieve from websites may be web pages, and image data. In addition, such information may be AV streams, stream management information, and PL information. WebPage objects may conduct processing in cooperation with search engines. Furthermore, description languages in the enhanced mode may be C++, C#, Perl and the like.

INDUSTRIAL APPLICABILITY

Since a recording medium according to the present invention effectively enhances the added value of video data structuring movie words, it is possible to supply more appealing move works to the market, and stimulate the market for movies and consumer appliances. Therefore, a recording medium and playback apparatus according to the present invention are highly applicable in the movie and consumer appliance industries.

Numerical References
1 BD drive
2 Read buffer
3 Demultiplexer
4 Video decoder
5 Video plane
6 Plane
7 Composition unit
8 Switch
9 Decoder
10 Presentation Graphics plane
11 Composition unit
12 Font generator
13 I-Graphics decoder 13
14 Switch
15 Enhanced Interactive Graphics plane
16 Composition unit
18 Read buffer
19 Demultiplexer
20 Audio decoder
21 Switch
22 Switch
23 Static scenario memory
24 Dynamic scenario memory
25 Switch
26 CLUT unit
27 CLUT unit
28 Switch
29 Control unit
31 Playback control engine
32 Player register
33 DVD-like module
34 Java module
35 BROWSER module
36 UO manager
37 Module manager
200 Playback apparatus
300 Television
400 Remote controller

The invention claimed is:

1. A computer readable non-transitory recording medium on which is recorded a digital stream and an application, wherein
the application is a program written in a virtual machine-oriented programming language, and performs screen rendering by writing each of pixels having 32-bit scale color to a first plane memory,
multiplexed on the digital stream is a video stream and at least one interactive graphics stream, the at least one interactive graphics stream being for providing, to the a second plane memory, each of pixels expressed using 8-bit scale index color in a movie mode in which the a virtual machine does not operate,
in the movie mode, the at least one interactive graphics stream is supplied to a graphics decoder,
when a playback apparatus performs playback of the computer readable non-transitory medium and the application is executed in the virtual machine-oriented programming language operation mode, the playback apparatus writes rendition contents to the first plane memory, and
the second plane memory is configured such that each of pixels has 8-bit scale index color in the movie mode, and the first plane memory is configured such that each of pixels has 32-bit scale color in the virtual machine-oriented programming language operation mode.

2. A playback apparatus that performs playback of a digital stream, comprising:
a separation unit operable to separate a video stream and the a graphics stream from the digital stream;
a video decoder operable to decode the video stream obtained as a result of the separating;
a first plane memory and a second plane memory;
a graphics decoder operable to decode the graphics stream obtained as a result of the separating;
a command execution unit operable to execute a command in a movie mode; and
a platform unit operable to execute an application in a virtual machine-oriented programming language operation mode, wherein
in the movie mode, the separation unit supplies the graphics stream to the graphics decoder,
in the virtual machine-oriented programming language operation mode, the platform unit writes rendition contents to the first plane memory, and
the second plane memory is configured such that each of pixels has 8-bit scale index color in the movie mode, and the first plane memory is configured such that each of pixels has 32-bit scale color in the virtual machine-oriented programming language operation mode.

3. The playback apparatus of claim 2, wherein
in the movie mode, graphics display is implemented by converting index color stored in the plane memory into luminosity and color difference with use of palette data that exists in the graphics stream.

4. A recording method for a recording medium, said recording method comprising:
creating application data; and
recording the created application data to the recording medium; wherein
the application data includes a digital stream and an application,
the application is a program written in a virtual machine-oriented programming language, and performs screen rendering by writing each of pixels having 32-bit scale color to a first plane memory, multiplexed on the digital stream is a video stream and at least one interactive graphics stream, the at least one interactive graphics stream being for providing, to a second plane memory, each of pixels expressed using 8-bit scale index color in a movie mode in which a virtual machine does not operate, in the movie mode, the at least one interactive graphics stream is supplied to a graphics decoder, when a playback apparatus performs playback of the recording medium and the application is executed in the virtual machine-oriented programming language operation mode, the playback apparatus writes rendition contents to the first plane memory, and the second plane memory is configured such that each of pixels has 8-bit scale index color in the movie mode, and the first plane memory is configured such that each of pixels has 32-bit scale color in the virtual machine-oriented programming language operation mode.

* * * * *